(12) United States Patent
Hiwatari et al.

(10) Patent No.: US 9,031,230 B2
(45) Date of Patent: May 12, 2015

(54) ENCRYPTION PROCESSING DEVICE, ENCRYPTION PROCESSING METHOD, AND PROGRAM

(75) Inventors: Harunaga Hiwatari, Kanagawa (JP); Toru Akishita, Tokyo (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 13/990,829

(22) PCT Filed: Oct. 24, 2011

(86) PCT No.: PCT/JP2011/074468
§ 371 (c)(1),
(2), (4) Date: May 31, 2013

(87) PCT Pub. No.: WO2012/077419
PCT Pub. Date: Jun. 14, 2012

(65) Prior Publication Data
US 2013/0251144 A1    Sep. 26, 2013

(30) Foreign Application Priority Data
Dec. 9, 2010 (JP) ................. 2010-274807

(51) Int. Cl.
*H04L 9/00* (2006.01)
*H04L 9/28* (2006.01)
*H04L 9/06* (2006.01)

(52) U.S. Cl.
CPC ............... *H04L 9/28* (2013.01); *H04L 9/0625* (2013.01); *H04L 2209/122* (2013.01)

(58) Field of Classification Search
USPC .................................... 380/28–30
See application file for complete search history.

(56) References Cited

U.S. PATENT DOCUMENTS

2007/0083768 A1* 4/2007 Isogai et al. ............... 713/189
2010/0091991 A1* 4/2010 Shibutani et al. ........... 380/259

FOREIGN PATENT DOCUMENTS

JP    2003-345244 A    12/2003

OTHER PUBLICATIONS

Hamalainen et al., Design and Implementation of Low-area and Low-power AES Encryption Hardware Core. Proceeding of the 9$^{th}$ EUROMICRO Conference on Digital System Design (DSD06). IEEE 2006 pp. 577-583.
Nyberg, Generalized Feistel Networks. Advances in Cryptology—ASIACRYPI '96. 1996. pp. 91-104.
(Continued)

*Primary Examiner* — Ghazal Shehni
(74) *Attorney, Agent, or Firm* — Wolf, Greenfield & Sacks, P.C.

(57) ABSTRACT

A reduction in the size of encryption processing configuration applying generalized Feistel structures is achieved. The encryption processing configuration applies a generalized Feistel structure for dividing and inputting data into multiple lines, and repeatedly executing data transformation processing applying a round function on the data transferred to each line, and during the execution cycle of a matrix operation by a matrix operation executing unit for executing linear transformation processing applying a matrix on the data in a first line, an operation is executed on the matrix operation processing data from the initial cycle and data in a second line. This configuration enables a register to be used for both the storage of the data for the second line and the storage of the results of the matrix operation on the first line of data in progress, a reduction in the total number of registers, and thus a reduction in size.

11 Claims, 15 Drawing Sheets

(56) References Cited

OTHER PUBLICATIONS

Satoh et al., Hardware-Focused Performance Comparison for the Standard Block Ciphers AES, Camellia, and Triple-DES. Information Security. Lecture Notes in Computer Science. 6th International Conference. Bristol, UK. ISC 2003, LNCS 2851. Oct. 1-3, 2003: 252-266.

Sugawara et al., High-performance ASIC implementations of the 128-bit block cipher CLEFIA. IEEE. International Symposium on Circuits and Systems. 2008: 2925-2928.

Zheng et al., On the Construction of Block Ciphers Provably Secure and Not Relying on Any Unproved Hypotheses (Extended Abstract). CRYPTO '89 Proceedings on Advances in cryptology. Springer-Verlag New York, Inc. New York, NY, USA. 1989: 461-480.

* cited by examiner

FIG. 12

| | CYCLE 1 | CYCLE 2 | CYCLE 3 | CYCLE 4 | CYCLE 5 |
|---|---|---|---|---|---|
| $R_0$ | $d \cdot x_0$ | $c \cdot x_0 \oplus d \cdot x_1$ | $b \cdot x_0 \oplus c \cdot x_1 \oplus d \cdot x_2$ | $y_0$ | $d \cdot x'_0$ |
| $R_1$ | $c \cdot x_0$ | $b \cdot x_0 \oplus c \cdot x_1$ | $a \cdot x_0 \oplus b \cdot x_1 \oplus c \cdot x_2$ | $y_1$ | $c \cdot x'_0$ |
| $R_2$ | $b \cdot x_0$ | $a \cdot x_0 \oplus b \cdot x_1$ | $d \cdot x_0 \oplus a \cdot x_1 \oplus b \cdot x_2$ | $y_2$ | $b \cdot x'_0$ |
| $R_3$ | $a \cdot x_0$ | $d \cdot x_0 \oplus a \cdot x_1$ | $c \cdot x_0 \oplus d \cdot x_1 \oplus a \cdot x_2$ | $y_3$ | $a \cdot x'_0$ |
| $R_4$ | — | — | — | — | $E_0 \oplus y_0$ |
| $R_5$ | — | — | — | $E_0$ | $E_1 \oplus y_1$ |
| $R_6$ | — | — | $E_0$ | $E_1$ | $E_2 \oplus y_2$ |
| $R_7$ | — | $E_0$ | $E_1$ | $E_2$ | $E_3 \oplus y_3$ |

FIG. 13

|   | CYCLE 1 | CYCLE 2 | CYCLE 3 | CYCLE 4 | CYCLE 5 |
|---|---|---|---|---|---|
| $R_0$ | $E_1 \oplus d \cdot x_0$ | $E_2 \oplus c \cdot x_0 \oplus d \cdot x_1$ | $E_3 \oplus b \cdot x_0 \oplus c \cdot x_1 \oplus d \cdot x_2$ | $E_0 \oplus y_0$ | $E'_1 \oplus d \cdot x'_0$ |
| $R_1$ | $E_2 \oplus c \cdot x_0$ | $E_3 \oplus b \cdot x_0 \oplus c \cdot x_1$ | $E_0 \oplus a \cdot x_0 \oplus b \cdot x_1 \oplus c \cdot x_2$ | $E_1 \oplus y_1$ | $E'_2 \oplus c \cdot x'_0$ |
| $R_2$ | $E_3 \oplus b \cdot x_0$ | $E_0 \oplus a \cdot x_0 \oplus b \cdot x_1$ | $E_1 \oplus d \cdot x_0 \oplus a \cdot x_1 \oplus b \cdot x_2$ | $E_2 \oplus y_2$ | $E'_3 \oplus b \cdot x'_0$ |
| $R_3$ | $E_0 \oplus a \cdot x_0$ | $E_1 \oplus d \cdot x_0 \oplus a \cdot x_1$ | $E_2 \oplus c \cdot x_0 \oplus d \cdot x_1 \oplus a \cdot x_2$ | $E_0 \oplus y_3$ | $E'_0 \oplus a \cdot x'_0$ |
| $R_4$ | — | — | — | — | $E_0 \oplus y_0$ |
| $R_5$ | — | — | — | $E'_0$ | $E_1 \oplus y_1$ |
| $R_6$ | — | — | $E'_0$ | $E'_1$ | $E_2 \oplus y_2$ |
| $R_7$ | — | $E'_0$ | $E'_1$ | $E'_2$ | $E_3 \oplus y_3$ |

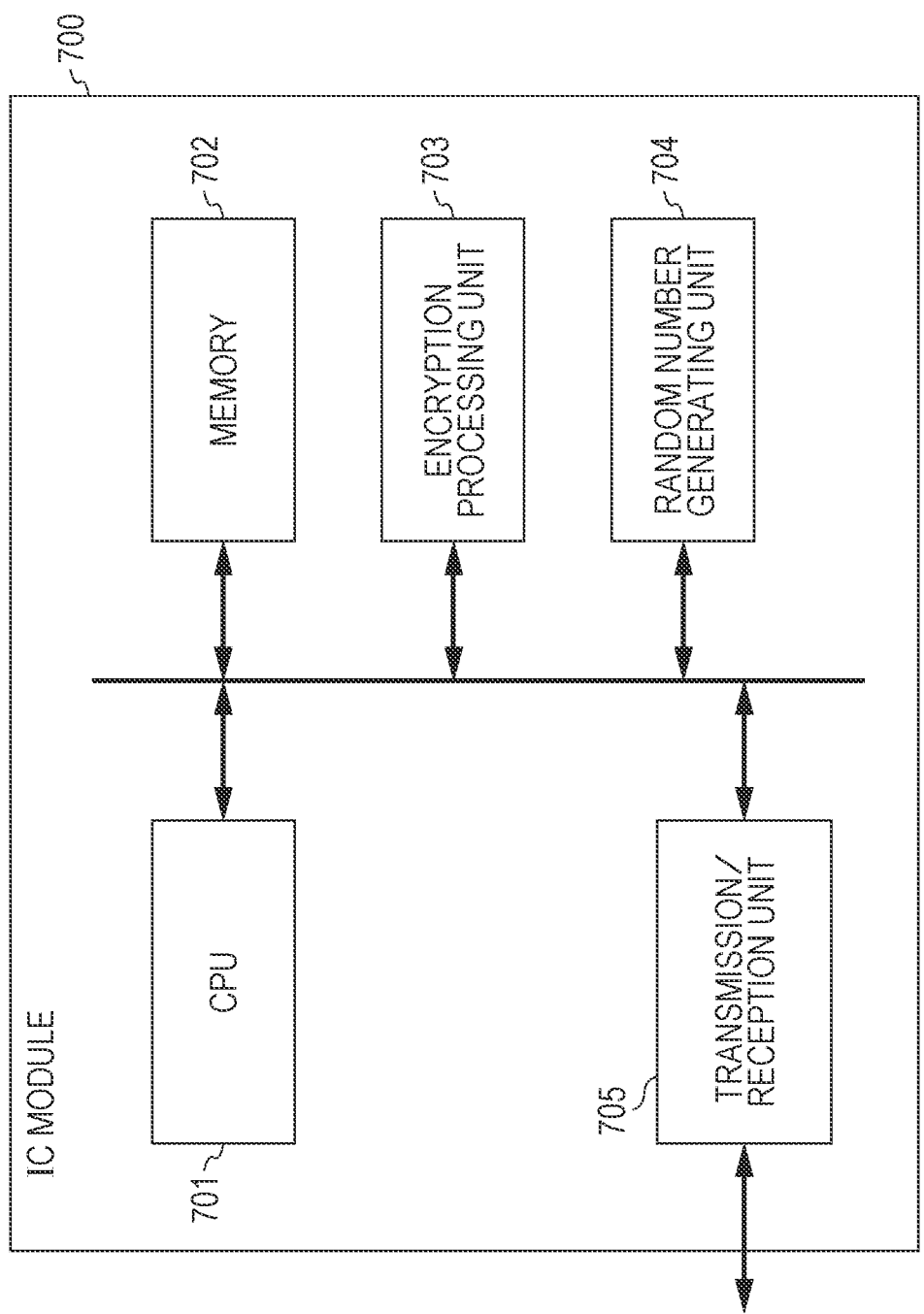

ENCRYPTION PROCESSING DEVICE, ENCRYPTION PROCESSING METHOD, AND PROGRAM

RELATED APPLICATIONS

This application is a national stage filing under 35 U.S.C. §371 of International Application No. PCT/JP2011/074468, filed on Oct. 24, 2011, which claims priority to Japanese Application No. 2010-274807 filed on Dec. 9, 2010. Each of these applications is incorporated herein by reference in its entirety.

TECHNICAL FIELD

The present invention is related to an encryption processing device, an encryption processing method, and a program. More particularly, the present invention is related to an encryption processing device, an encryption processing method, and a program executing shared key block ciphers with a Feistel structure or generalized Feistel structure.

BACKGROUND ART

As information-oriented societies progress, the demand for information security technologies to safely protect the information used continues to increase. One configuration element of information security technologies is encryption technology, and these encryption technologies are currently used in various products and systems.

There are many different encryption processing algorithms, and one basic example of such a technology is what is known as a shared key block cipher. There are two shared keys with the shared key block cipher, an encryption key and a decryption key. During encryption and decryption processing, multiple keys are generated from the share keys and data transformation processing is repeatedly executed in units of block data sizes such as 64-bit, 128-bit, and 256-bit block units.

As for representative shared key block cipher algorithms, there are known are the DES (Data Encryption Standard), which was the previous US standard, and the AES (Advanced Encryption Standard), which is the current US standard. Many other shared key block ciphers exit are still being proposed even now, and the CLEFIA proposed by Sony Corporation in 2007 is also a shared key block cipher.

This kind of shared key block cipher algorithm is mainly configured with an encryption processing unit including a round function executing unit for repeatedly executing input data transformations and a key scheduling unit for generating round keys applied to each round of the round function unit. The key scheduling unit generates an expanded key with increased bit counts based on a master secret key (main key), and then generates round keys (secondary keys) applied for each round function unit of encryption processing based on the generated expanded key.

A commonly known specific structure for executing this kind of algorithm repeatedly executes a round function that includes a linear transformation unit and a non-linear transformation unit. The most common of this kind of structure is the Feistel structure and the generalized Feistel structure. The Feistel structure and the generalized Feistel structure converts plaintext into ciphertext by a simple repetition of a round function that includes an F function functioning as a data transformation function. The F function executes linear transformation processing and non-linear transformation processing. Further details disclosing encryption processing applying the Feistel structure may be found in NPL 1 and NPL 2, for example.

The two types of embodiments of encryption algorithms include software embodiments and hardware embodiments. Hardware embodiments may be implemented with smaller circuit sizes, which lead to decreased costs and lower power consumption efficiency when implementing a hardware-based design. For this reason, many implementation methods to reduce size are proposed regardless of whether for new algorithms or existing algorithms.

For example, Hamalainen, Alho, Hannikainen, Hamalainen, et al., propose an implementation to reduce size of devices using the AES encryption algorithm with a Substitution Permutation Network (SPN) structure. Details on this implementation method to reduce size is disclosed in NPL 3 [Panu Hamalainen, Timo Alho, Marko Hannikainen, and Timo D. Hamalainen, Design and implementation of low-area and low-power aes encryption hardware core. In DSD, pages 577-583. IEEE Computer Society, 2006.9].

However, this implementation method to reduce size is applicable to processing sequences involving AES algorithms using the SPN structure, and so this results in a problem in which a sufficient reduction in size is not attainable when directly applied to DES and CLEFIA encryption algorithms with the previously described Feistel structure and a generalized Feistel structure, which are different from the SPN structure.

Further, the previously described AES encryption is an encryption algorithm using the SPN structure, and the DES encryption and the CLEFIA encryption are encryption algorithms using the Feistel structure and the generalized Feistel structure, which are different from the SPN structure. Details on these structures will be described in the following paragraphs.

CITATION LIST

Non Patent Literature

NPL 1: K. Nyberg, "Generalized Feistel networks", ASIACRYPT '96, Springer Verlag, 1996, pp. 91-104.

NPL 2: Yuliang Zheng, Tsutomu Matsumoto, Hideki Imai, "On the Construction of Block Ciphers Provably Secure and Not Relying on Any Unproved Hypotheses". CRYPTO 1989, pp. 461-480

NPL 3: Panu Hamalainen, Timo Alho, Marko Hannikainen, and Timo D. Hamalainen. Design and implementation of low-area and low-power aes encryption hardware core. In DSD, pages 577-583. IEEE Computer Society, 2006.9

SUMMARY OF INVENTION

Technical Problem

The present invention has been made in light of the previously described situation, with the aims of providing an encryption processing device, encryption processing method, and a program to attain a reduction in size regarding encryption processing structures using the Feistel structure and generalized Feistel structure.

Solution to Problem

According to a first aspect of the present invention,
an encryption processing device includes
an encryption processing unit for dividing and inputting data to be processed in data blocks of a configured bit size into a plurality of lines, and repeatedly executing data transformation processing applying a round function on the data transferred to each line;
wherein the encryption processing unit includes
an operation unit for generating transformed data regarding the data for a first line from the plurality of lines, performing an operation on the data from the first line and a different, second line regarding the generated transformed data, and repeatedly executes an operation to use the data obtained as a result as input data for a next round, and
a register for storing the operation results from the operation unit,
and wherein the operation unit is configured to sequentially obtain the data from the register, performs an operation in the sequence the data was obtained, and store the results of which into the register,
and wherein the operation unit includes
a matrix operation executing unit for executing linear transformations applying a matrix to the data in the first line,
and the matrix operation executing unit
executes, when a first cycle of a matrix operation is executed, an operation on the data in the second line during the execution of a matrix operation on the data in the first line.

Further, regarding an embodiment of the encryption processing device of the present invention, the matrix operation executing unit is configured to execute the matrix operation over a plurality of cycles on a plurality of data units sequentially output from an upstream non-linear transformation unit, and to perform an operation on the data in the second line in conjunction with the matrix operation on the unit data input from the non-linear transformation unit during a first cycle of the plurality of cycles.

Further, regarding an embodiment of the encryption processing device of the present invention, the encryption processing device is configured without an independent register for storing the data from the second line important for executing an operation on the data in the second line after the important operation cycle of the matrix operation on the data in the first line finishes, and to use a register for storing the results of the matrix operation in progress on the data in the first line as a register for storing the data from the second line.

Further, regarding an embodiment of the encryption processing device of the present invention, the matrix operation executing unit performs an XOR operation on the matrix operation process data regarding the first line and the data in the second line during an initial cycle for executing the matrix operation on the data in the first line.

Further, regarding an embodiment of the encryption processing device of the present invention, the matrix operation executing unit is configured to execute the matrix operation applying a cyclic matrix or a Hadamard matrix.

Further, regarding an embodiment of the encryption processing device of the present invention, the encryption processing unit acts as an executing unit of the round function, including a non-linear transform unit for executing non-linear transformations, and a matrix operation executing unit functioning as a linear transformation unit for executing linear transformations applying a matrix.

Further, regarding an embodiment of the encryption processing device of the present invention, the matrix operation executing unit sequentially inputs output from an S-box functioning as the non-linear transform unit and performs a matrix operation on the input data as one cycle of processing.

Further, regarding an embodiment of the encryption processing device of the present invention, the encryption processing executed by the encryption processing unit applies a Feistel structure or a generalized Feistel structure.

Further, regarding an embodiment of the encryption processing device of the present invention, the encryption processing executed by the encryption processing unit follows the CLEFIA encryption algorithm.

Further, according to a second aspect of the present invention,
an encryption processing method executes an encryption processing by an encryption processing device, the encryption processing method including
an encryption processing step in which an encryption processing unit divides and inputs data to be processed in data blocks of a configured bit size into a plurality of lines, and repeatedly executes data transformation processing applying a round function on the data transferred to each line;
wherein during the encryption processing step, transformation processing is executed on the data for a first line configured from the plurality of lines, an operation is performed on the data from the first line and a different, second line regarding the generated transformed data, and an operation is repeatedly executed to use the data obtained as a result as input data for a next round;
and wherein, when a matrix operation processing is in an initial cycle, an operation is executed on the data in the second line during the execution cycle of a matrix operation for executing the processing to generate transform data from the data in the first line.

Further, according to a third aspect of the present invention,
a program executing an encryption processing in an encryption processing device, the program including
an encryption processing step in which an encryption processing unit divides and inputs data to be processed in data blocks of a configured bit size into a plurality of lines, and repeatedly executes data transformation processing applying a round function on the data transferred to each line;
wherein during the encryption processing step, transformation processing is executed on the data for a first line configured from the plurality of lines, an operation is performed on the data from the first line and a different, second line regarding the generated transformed data, and an operation is repeatedly executed to use the data obtained as a result as input data for a next round, and an operation is executed,
and wherein, when a matrix operation processing is in an initial cycle, an operation is executed on the data in the second line during the execution cycle of a matrix operation for executing the processing to generate transform data from the data in the first line.

Further, the program of the present invention is a program provided on a recording medium, for example, regarding an information processing device or computer system capable of executing various program code, for example. Processing is achieved according to the program by executing this kind of program by a program executing unit in the information processing device or computer system.

Other purposes, feature, and advantages of the present invention should be understood by the detailed description based on the attached figures and embodiments described later. Note that system as used in the present specification is a logical assembly of multiple devices, and the devices of each configuration are not necessarily in the same casing.

Advantageous Effects of Invention

The configuration of an embodiment of the present invention enables a reduction in size and lower power consumption of an encryption processing configuration applying a generalized Feistel structure.

Specifically, an encryption processing configuration applying a generalized Feistel structure in which data is divided and input into multiple lines, and data transformation processing is repeatedly executed applying a round function on the data transferred into each line, wherein during an execution cycle of matrix operation in which a matrix operation executing unit executes a linear transformation processing applying a matrix to the data in a first line, an operation is performed on the matrix operation process data in a first cycle and the data for a second line. This configuration enables a register to be used for both the storage of the data for the second line and the storage of the results of the matrix operation on the first line of data in progress, a reduction in the total number of registers, and thus a reduction in size. Further, the reduction in size of the circuit configuration also enables a reduction in power consumption due to a reduction in the number of elements.

BRIEF DESCRIPTION OF DRAWINGS

FIG. 12 is a diagram illustrating a matrix calculating sequence for a matrix calculating circuit 304 following the data path illustrated in FIG. 9.

FIG. 13 is a diagram illustrating a matrix calculating sequence for a matrix calculating circuit 504 following the data path illustrated in FIG. 11.

FIG. 15 is a diagram illustrating a configuration example of an IC module 700 as an encryption processing device.

DESCRIPTION OF EMBODIMENTS

An encryption processing device, an encryption processing method, and a program according to the present invention will be described in detail below with reference to the figures. The description is organized into the following sections.
1. Overview of Share Key Block Ciphers
2. Overview of Method to Reduce Size of AES Encryption Algorithms Applying the SPN Structure
3. Details on Structure and Processing of Matrix Calculating Circuits Regarding Reduced Size SPN Structures
4. Issues with Applying Reduced Size SPN Structures to Generalized Feistel Structures
5. Structures to Achieve Size Reduction of Generalized Feistel Structures
6. Advantageous Effects and Other Embodiments of Structures Regarding the Present invention
7. Example Configuration of Encryption Processing Device as an IC Card 1. Overview of Share Key Block Ciphers First, an overview of shared key block ciphers that are applicable to the present invention will be described. The shared key block cipher (hereafter, block cipher) according to the present specification indicates ciphers according to the following definition.

A plaintext P and a key K are input into a block cipher, which outputs a ciphertext C. The bit length of the plaintext and the ciphertext is called a block size, and this is represented as n here. n may be set to an arbitrary integer value, but this is usually a singularly predetermined value for each block cipher algorithm. Note that there may also be algorithms which handle multiple block lengths. When a block cipher with a block length of n may be called an n-bit block cipher.

The key bit length is represented as k. Keys can be set to an arbitrary integer value. Shared key block cipher algorithms are compatible with either one or multiple key sizes. For example, a certain block cipher algorithm A may have a configuration that supports a block size n of 128, and several key sizes with bit lengths k of 128, 192, or 256.

Figure 1:
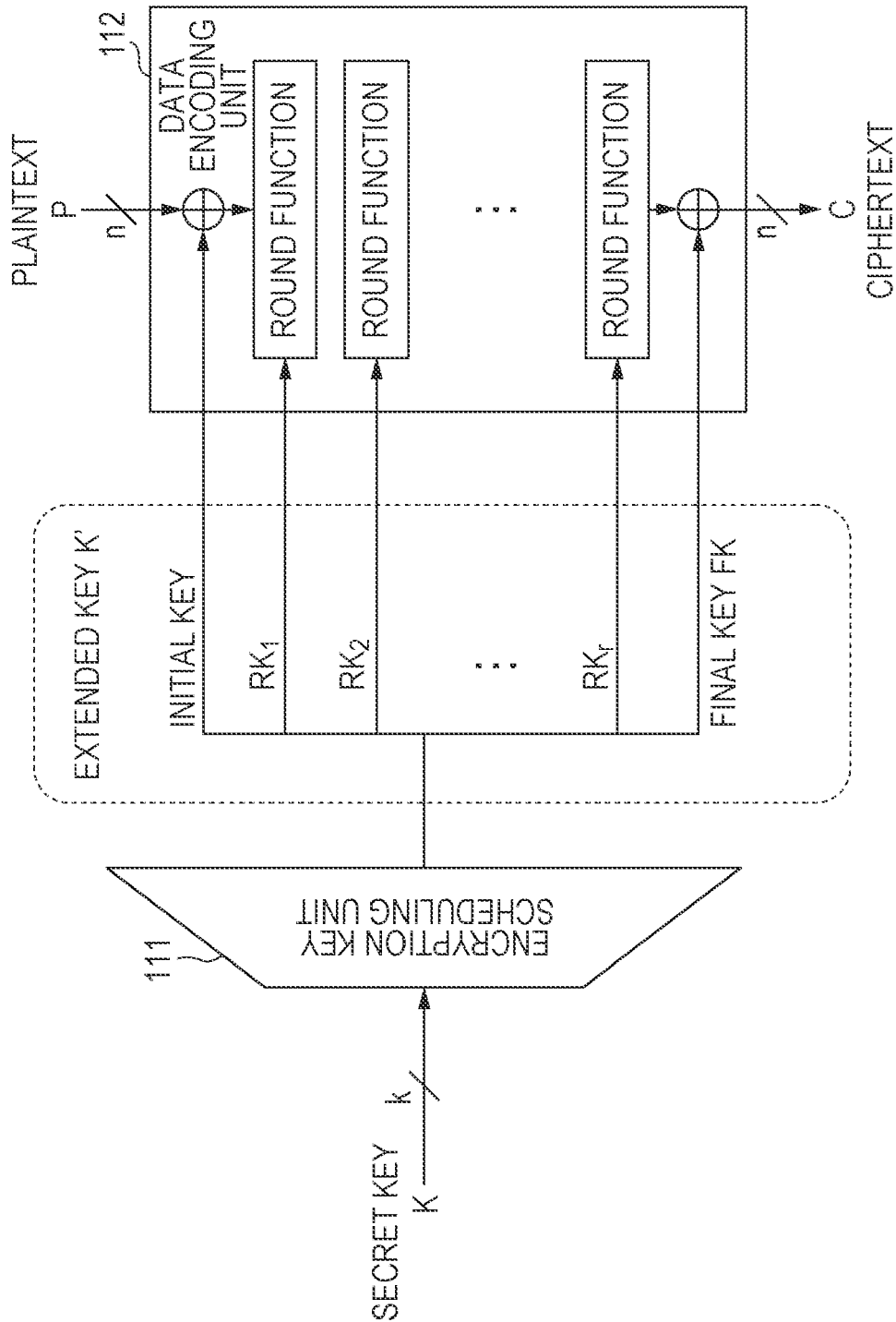
FIG. 1 is a diagram describing an n-bit shared key block cipher algorithm corresponding to a key length of k-bits.

The bit size of each the plaintext [P], the ciphertext [C], and the key [K] are as follows:
Plaintext P: n bit
Ciphertext C: n bit
Key K: k bit FIG. 1 is a diagram describing an n-bit shared key block cipher algorithm supporting a key length of k bits. As illustrated in FIG. 1, the shared key block encryption processing inputs the plaintext P of n bits, and a secret key K of k bits, executes a previously determined encryption algorithm, and outputs the ciphertext C of n bits. Further, FIG. 1 illustrates the encryption processing to generate ciphertext from plaintext, and decryption processing to generate ciphertext from plaintext is performed by reversing the input sequence of keys, and configuring the inverse function of a round function.

Block ciphers may be divided into two portions. One portion is a key scheduling unit 111 which inputs the key K, expands the bit length of the input secret key K by some predetermined step, and outputs the expanded key K' (bit length k'), and the other portion is a data encryption unit 112 to receive a round key RK or similar generated from the plaintext P and the expanded key K' input from the key scheduling unit 111, inputs the plaintext P, executes encryption processing applying the round key RK or similar, and then executes a data transformation to generate the ciphertext C. Further, as previously described, the decryption processing is implemented by changing the data encryption unit 112.

In this way, the shared key block cipher algorithm is configured with the data encryption unit 112 including a round function to repeatedly execute transformation of the input data, and the key scheduling unit 111 to generate round keys applied to each round of a round function unit. The key scheduling unit 111 inputs the secret key K, and generates round keys to be input into each round function. For example, regarding a block cipher configured to perform a round function of r rounds, a round key is input into the round function corresponding to each round from 1 to r, labeled $RK_1$, $RK_2, \ldots, R_r$. Also, the key scheduling unit 111 outputs an initial key IK and a final key FK to the data encryption unit 112, and an XOR operation is performed on these keys and the processed data.

Figure 2:
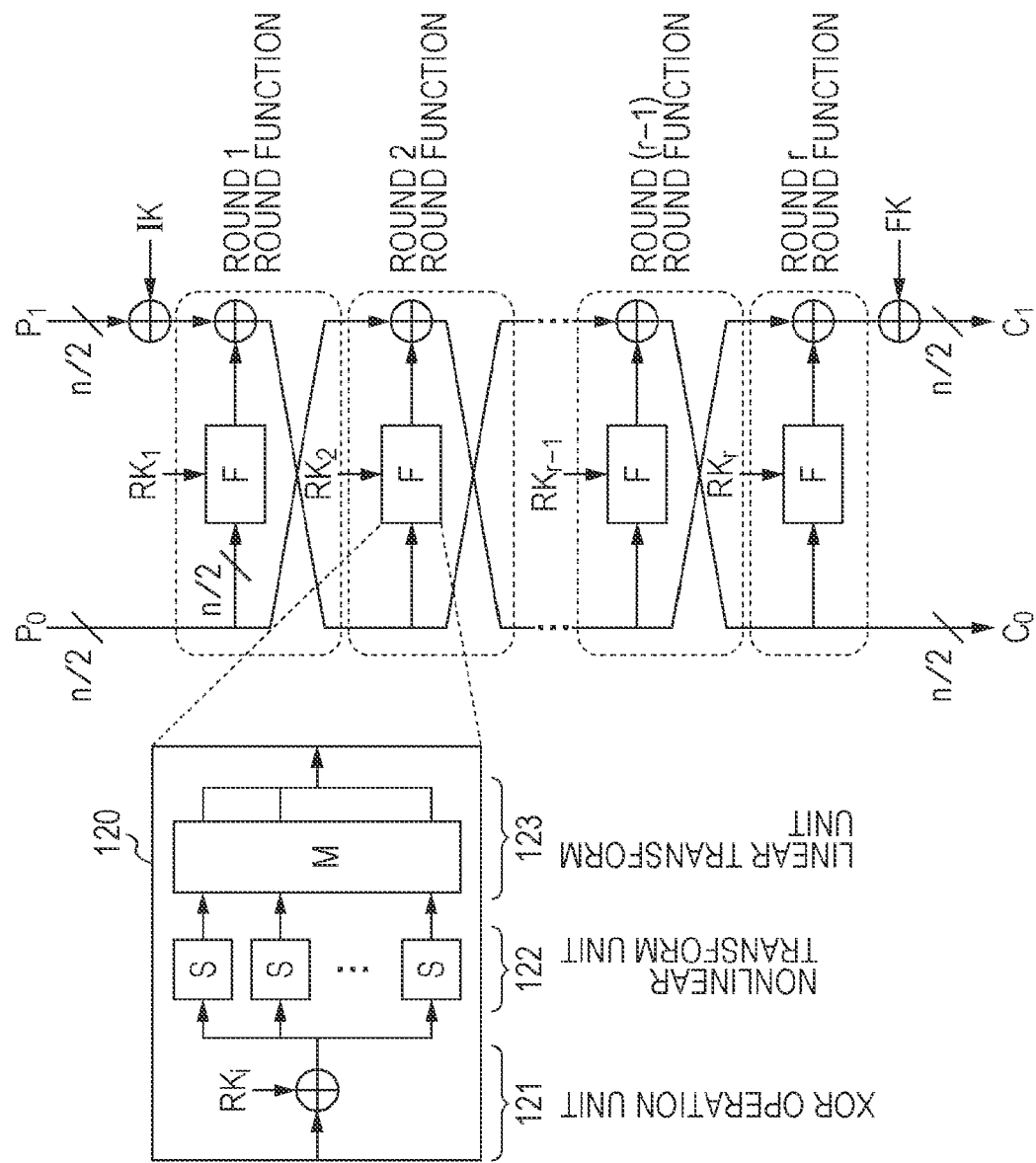
FIG. 2 is a diagram describing a general structure of a Feistel structure and a detailed structure example of one F function.

As previously described, the Feistel structure is the most common structure used in the data encryption unit 112 regarding shared key block ciphers. FIG. 2 illustrates an example structure of a specific Feistel structure for a block length of n bits (n-bit).

The Feistel structure includes a structure to convert plaintext into ciphertext by a simple repetition of a round function including an F function as a data transformation function. The F function executes linear transformation processing and non-linear transformation processing.

The right side of FIG. 2 illustrates the overall structure of the Feistel structure, and the left side of FIG. 2 is a diagram illustrating a detailed configuration of an F function 120.

As illustrated in the right side of FIG. 2, the Feistel structure is configured so that the n-bit data is divided into a 2-line structure in which each line is n/2 bits, one of these n/2-bit lines is input into the F function of the round, and an XOR operation is performed on this output with the other n/2-bit line.

The F function for each round is input with the round keys $RK_1$ through $RK_r$ generated from the expanded key K' input from the key scheduling unit 111.

There are various types of configurations of the F function, and as a known example, the configuration of the F function 120 illustrated in FIG. 2 includes an XOR operation unit 121 for executing XOR operations against the round keys, a nonlinear transform unit [S] 122, called an S-box, for executing nonlinear transform operations against the output from the XOR operation unit 121, and a linear transform unit [M] 123 for performing linear operations by matrix calculations against the output of the nonlinear transform unit [S] 122.

Further, the structure illustrated in FIG. 2 is only one configuration example of the Feistel structure. There are other configurations of this structure such as a configuration in which positions are changed by XOR operations performed on the initial key IK and the final key FK.

The configuration illustrated in FIG. 2 divides input P of n bits representing the data to be processed (configuration data of plaintext, for example) into a 2-line structure in which each line is n/2 bits, and then processing is performed on this 2-line structure. This kind of structure in which input is divided into two parts before being process is called the Feistel structure.

The data to be processed is not limited to being divided into only two parts, as various configurations may be created. Feistel structures which are not limited to two divisions are called generalized Feistel structures.

An example of a generalized Feistel structure will be described with reference to FIG. 3. The configuration example illustrated in FIG. 3 divides the data to be processed into four parts before processing.

The Feistel structure described with reference to FIG. 2 divides plaintext data of n bits representing the data to be processed into a 2-line structure in which each line is n/2 bits, and then processing is performed on this 2-line structure. In contrast, the configuration illustrated in FIG. 3 divides plaintext data of n bits representing the data to be processed into a 4-line structure in which each line is n/4 bits, and then processing is performed on this 4-line structure.

Figure 3:
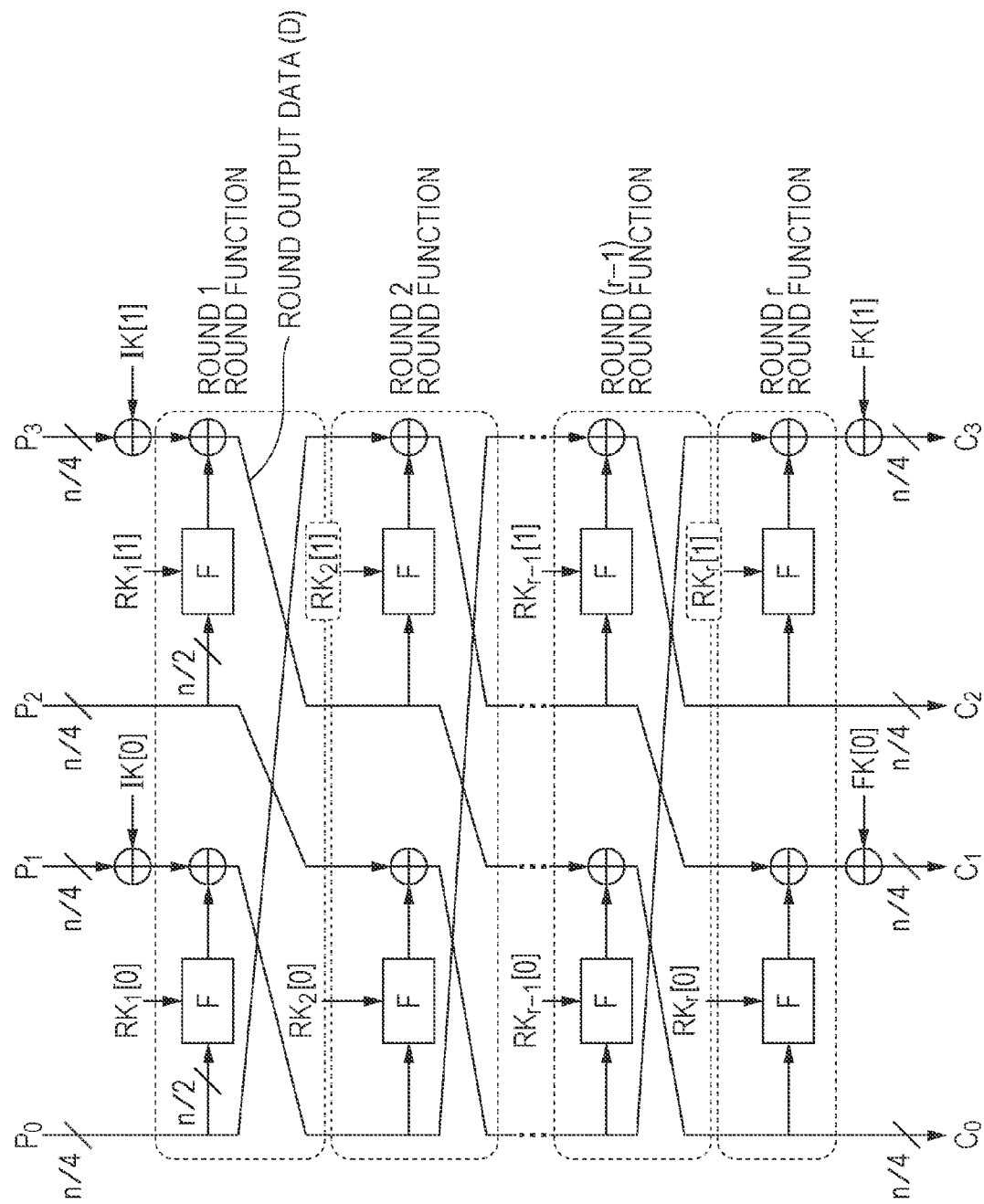
FIG. 3 is a diagram describing an example of a generalized Feistel structure.

The configuration illustrated in FIG. 3 is called a 4-line generalized Feistel structure. Similar to the Feistel structure described with reference to FIG. 2, the 4-line generalized Feistel structure illustrated in FIG. 3 also repeatedly executes a round function having an F function.

However, the data flow becomes complex when dividing the n-bit input into four parts as illustrated in FIG. 3. According to the configuration illustrated in FIG. 3, the n-bit data is divided into a 4-line structure in which each line is n/4 bits, and each 2-line structure with this 4-line structure is input into the F function, and an XOR operation is performed on this output with the other 2-line structure.

Similar to the F function 120 described with reference to FIG. 2, the configuration of the F function includes an XOR operation unit 121 for executing XOR operations against the round keys, a nonlinear transform unit [S] 122, called an S-box, for executing nonlinear transform operations against the output from the XOR operation unit 121, and a linear transform unit [M] 123 for performing linear operations by matrix calculations against the output of the nonlinear transform unit [S] 122.

As with the 4-line generalized Feistel structure illustrated in FIG. 3, by changing the processing lines at a data encryption unit from a 2-line structure to a 4-line structure, a round key $RK_i$, the initial key IK, and the final key FK are divided from the n/2-bit data into an $RK_i$ [0] of n/4 bits, an $RK_i$ [1], an IK [0], an IK [1], an FK [0], and an FK [1].

Further, FIG. 3 illustrates a 4-line generalized Feistel structure, but any Feistel structure in which the processing data is divided into structures of more than two lines is called generalized Feistel structures.

The following description of the present invention will be described using the 4-line generalized Feistel structure as an applicable example of the present invention. However, the present invention is not limited to a 4-line generalized Feistel structure, and may be applied to a 2-line (2-line) Feistel structure or a generalized Feistel structure that processes any arbitrary number of lines more than two (2-line).

2. Overview of Method to Reduce Size of AES Encryption Algorithms Applying SPN Structure Next, as a precursor to the description of the embodiments according to the present invention, on overview of a method to reduce the size of AES encryption algorithms applying the SPN structure previously proposed will be described.

As previously described, configurations have been proposed such as, for example, that by Hamalainen, Alho, Hannikainen, and Hamalainen to reduce the size of AES encryption algorithms with Substitution Permutation Network (SPN) structures such as by reducing the required register count. Details on this method to reduce size is disclosed in NPL 3 [Panu Hamalainen, Timo Alho, Marko Hannikainen, and Timo D. Hamalainen. Design and implementation of low-area and low-power aes encryption hardware core. In DSD, pages 577-583. IEEE Computer Society, 2006.9].

The method to reduce the size of this AES encryption algorithm will be described.

First, a random function of the AES encryption algorithm applying the SPN structure will be described with reference to FIG. 4.

Further, similar to the Feistel structure, the AES encryption algorithm applying the SPN structure repeatedly executes a round function multiple times.

Figure 4:
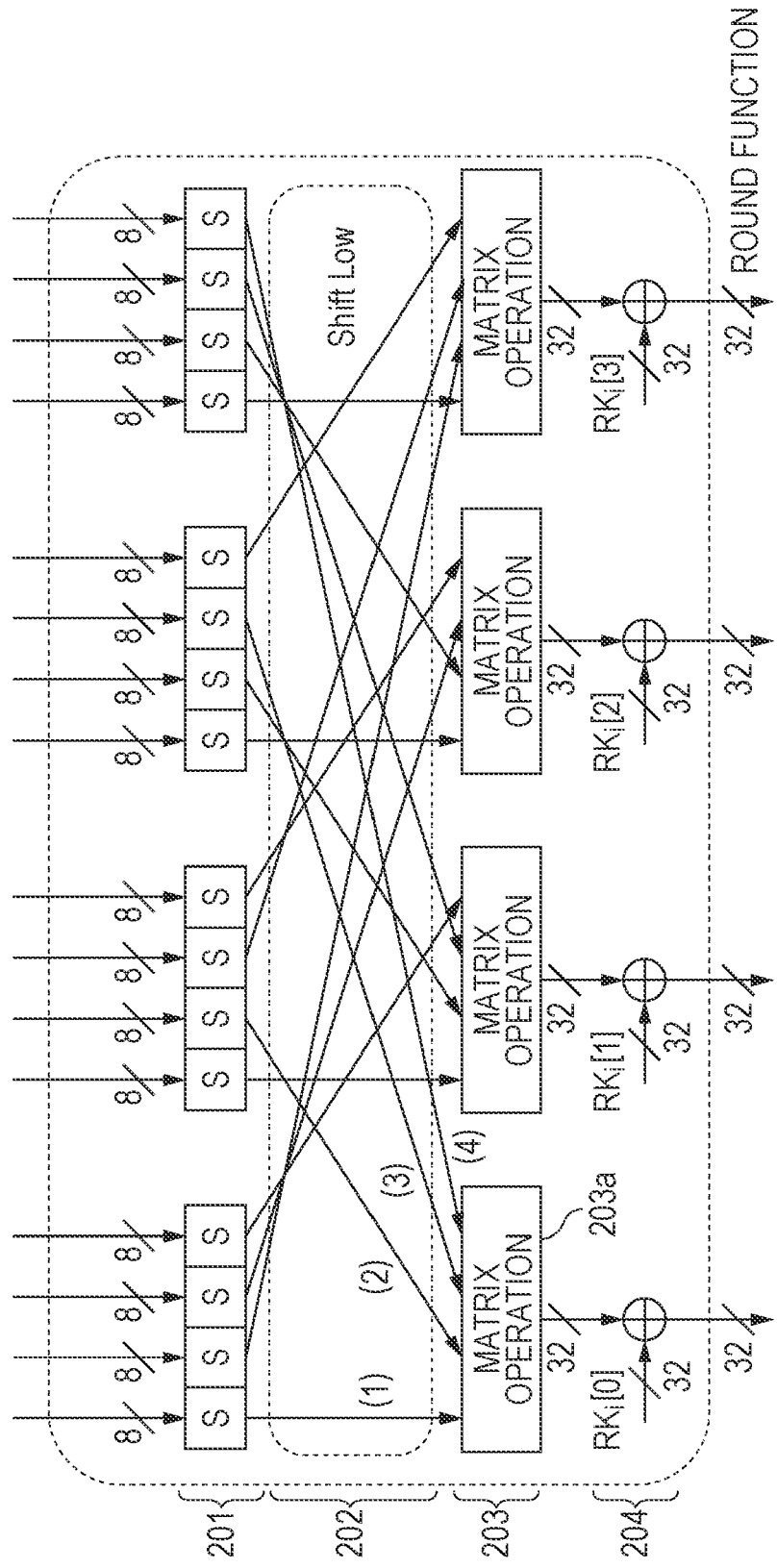
FIG. 4 is a diagram describing a structure of a round function in an AES encryption algorithm to which is applied an SPN structure.

FIG. 4 is a diagram illustrating a configuration example of a round function executing unit used in the AES encryption algorithm applying the SPN structure. According to AES, the round function illustrated in FIG. 4 repeatedly generates ciphertext from plaintext and plaintext from ciphertext multiple times.

The round function executing unit illustrated in FIG. 4 is configured with the following configuration elements.

The configuration includes a nonlinear transform unit 201 comprised of 16 S-box units with an 8-bit input and output for executing nonlinear transform processing, a shift low executing unit 202 for switching the 8-bit output from the S-box units configuring the nonlinear transform unit 201, a linear transform unit 203 comprised of four matrix operation units for executing linear transform operations by inputting the output from the shift low executing unit 202 in 32-bit units and applying this to a matrix, and an XOR operation unit 204 comprised of 4 operation units for performing XOR operations with 32-bit round keys against the 32-bit output from each of the four matrix operation units configuring the linear transform unit 203.

The example illustrated in FIG. 4 is a round function executing unit with 128-bit input and output, and is configured to input the 16 8-bit S-box units as 128-bit data (8×16=128), and outputs 128-bit output, which is the combination of the four 32-bit XOR operation units (32×4=128). The series of processing performed by the nonlinear transform unit 201, the shift low executing unit 202, the linear transform unit 203, and the XOR operation unit 204 is executed as one round of the round function, and by repeating this round function multiple times, 128-bit output (ciphertext, for example) is generated and output from 128-bit input (plaintext, for example).

According to this implementation of AES, when one round of the round function processing (1 round), that is to say, the series of processing performed by the nonlinear transform unit 201, the shift low executing unit 202, the linear transform unit 203, and the XOR operation unit 204, is executed as one cycle (1 cycle), it is desirable to have a configuration in which a data encryption unit is configured with at least the 16 units of S-box circuits and the four matrix operation circuits, as illustrated in FIG. 4.

Hamalainen, et al. were able to achieve a reduction in size of the data encryption unit by configuring the one round of the round function processing (1 round) as a sequential serial processing of 16 cycles (16 cycle) instead of as a single cycle.

According to this configuration to reduce size, only one S-box circuit is used, and one matrix operation is executed over four cycles (4 cycle). Such an implementation enables the size of the matrix operation circuit to be reduced.

Figure 5:
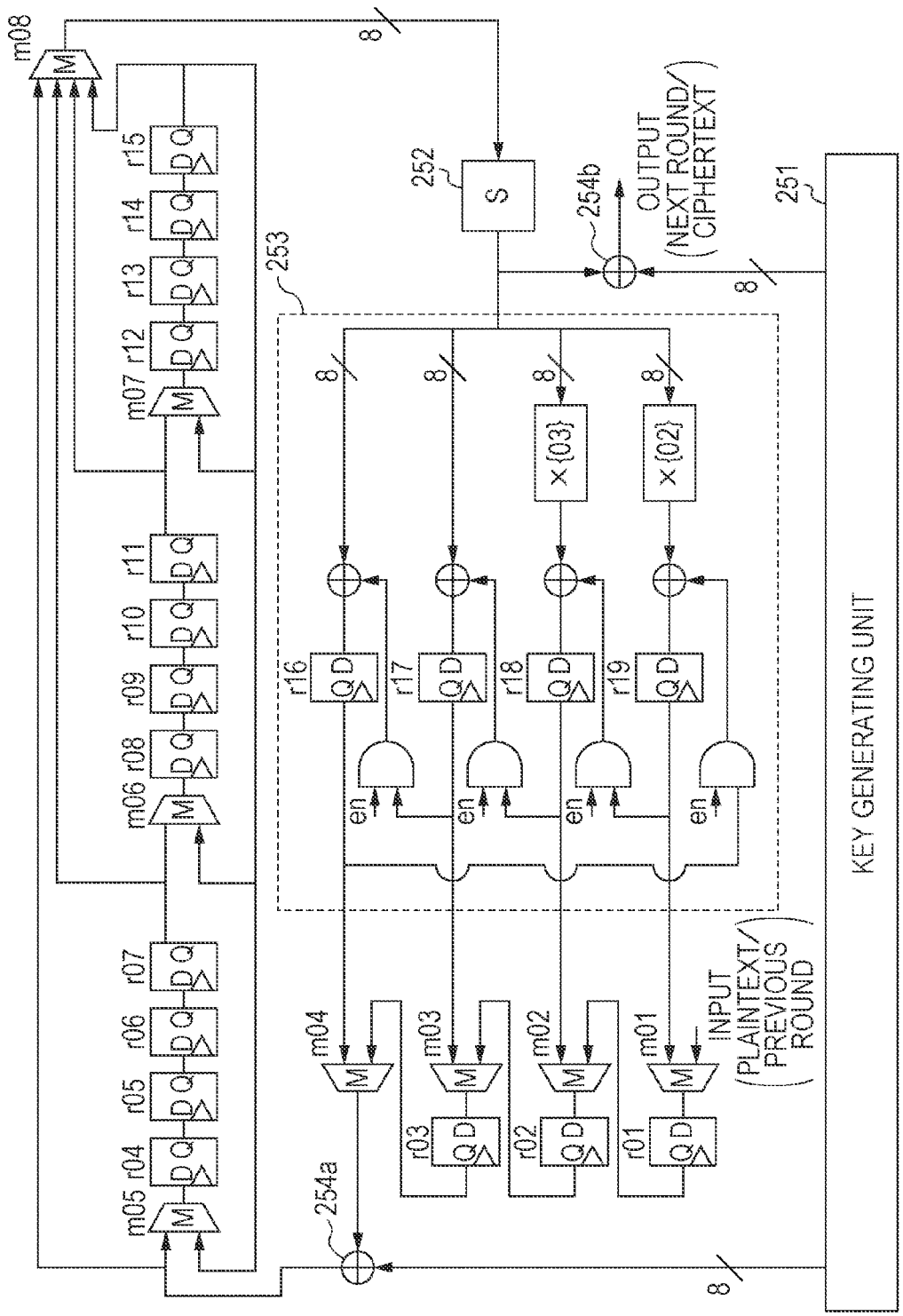
FIG. 5 is a diagram illustrating a data path of a data encryption unit for executing AES encryption as proposed by Hamalainen, et al.

FIG. 5 illustrates a data path of the data encryption unit executing the AES encryption proposed by Hamalainen, et al. The configuration illustrated in FIG. 5 is equivalent to a hardware configuration executing the AES round function illustrated in FIG. 4.

Regarding the configuration illustrated in FIG. 5, the data in processing is divided into 8-bit units, and each unit of 8-bit data is stored in registers r01 through r19. 19 registers (r01 through r19) are illustrated in FIG. 5. Each of the 19 registers (r01 through r19) are 8-bit registers for storing 8-bit data.

As described with reference to FIG. 4, the configuration example illustrated in FIG. 4 is a round function executing unit with 128-bit input and output, and the configuration in FIG. 5 corresponds to a hardware configuration that executes the round function with 128-bit input and output as a serial processing of data in 8-bit units.

With the configuration in FIG. 5, it is sufficient for the number of necessary 8-bit registers to store the input and output data to be 16 registers, as 128 divided by 8 equals 16. There are 19 registers in FIG. 5, which is a surplus of three registers, but the 24 bits worth of register provided by these three registers are used for the matrix operation processing that executes the linear transform operations applying a matrix.

Also, as described with reference to FIG. 4, according to AES, data substitution is executed by the shift low executing unit between the S-box units for executing non-linear transformations and the matrix operations for executing linear transformations. According to the implementation method proposed by Hamalainen, et al., the performing of data substitution at the shift low executing unit by the implementation of multiplexers (Multiplexer) m01 through m08 before several of the registers as in FIG. 5.

As illustrated in FIG. 5, there is only one S-box 252 functioning as a non-linear transform unit. 8-bit data is sequentially input into this S-box 252, and the non-linear transformation processing is executed by the 16 S-box units illustrated in FIG. 4 in 16 cycles.

The output from the S-box 252 is input into a matrix operation circuit 253, and linear transformation processing applying a matrix is executed by the matrix operation circuit 253. Further, according to the configuration in FIG. 4, the matrix operation is performed after the data processed by the S-box units is substituted by the shift low executing unit, but according to the example in FIG. 5, the output from the S-box 252 is directly input into the matrix operation circuit 253. According to the configuration as in FIG. 5, processing equivalent to the substitution processing by the shift low executing unit is executed by the operation of the multiplexers m01 through m08 in the group of registers r01 through r19 illustrated in FIG. 5.

Processing of the four matrix operation circuits in the linear transform unit 203 illustrated in FIG. 4 is serially executed by the matrix operation circuit 253 illustrated in FIG. 5. The linear transformation processing applying the matrix executed by one of the four matrix operation circuits in the linear transform unit 203 illustrated in FIG. 4 is executed in 4 cycles. This processing will be described in detail later.

The XOR operation processing of the XOR operation unit 203 illustrated in FIG. 4 is executed by an XOR operation unit 254a and 254b as in FIG. 5. These XOR operation units 254a and 254b execute XOR operation processing on the processing data and the round key output by a key generating unit 251.

The data substitution processing of the shift low executing unit 202 illustrated in FIG. 4 is executed by the operation of the multiplexers m01 through m08 in the group of registers r01 through r19 illustrated in FIG. 5 as previously described.

There is only one S-box unit according to the executable configuration of the AES algorithm by the PSN structure proposed by Hamalainen, et al. illustrated in FIG. 5.

The number of registers is 152 bits worth of registers as illustrated in FIG. 5 (19 8-bit registers). Further, there has to be a 128-bit register to hold the 128-bit key data in the key generating unit 251.

The executable configuration of the AES algorithm applying the SPN structure proposed by Hamalainen, et al. illustrated in FIG. 5 achieves a reduction in size by the configuration of only one S-box unit and the minimum number of registers.

3. Details on Structure and Processing of Matrix Calculating Circuits Regarding Reduced Size SPN Structures Next, the configuration and processing of the matrix operation circuit regarding the reduced size SPN structure described with reference to FIG. 5 will be described.

The linear transformation processing applying the matrix executed by the matrix operation circuit 253 within the configuration of the AES algorithm using the SPN structure proposed by Hamalainen, et al. described with reference to FIG. 5 will be described.

Figure 6:
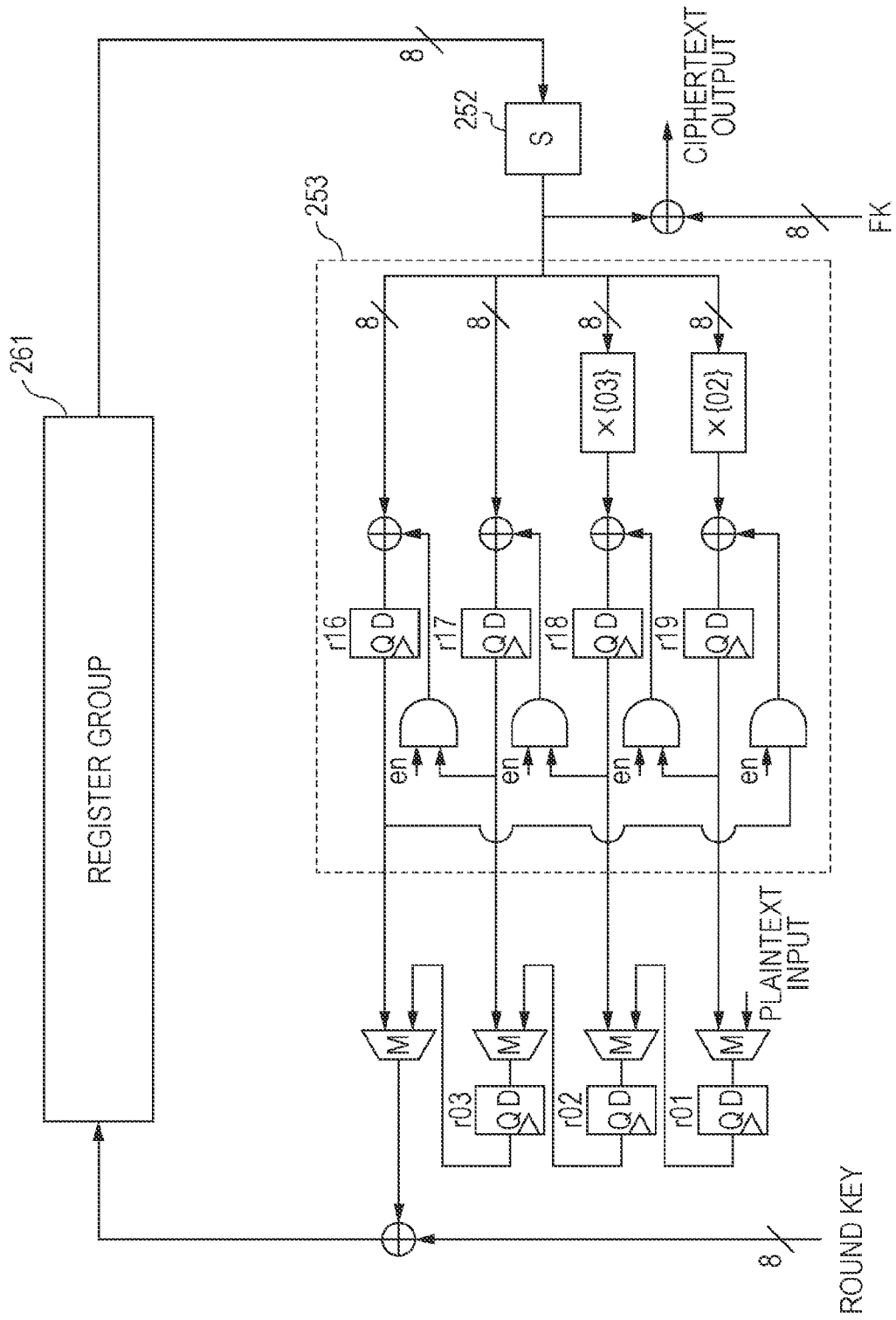
FIG. 6 is a diagram illustrating a simplified data path of a data encryption unit for executing AES encryption as proposed by Hamalainen, et al.

A simplified data path as illustrated in FIG. 6 will be used to describe the circuit for performing data substitutions by the shift low executing unit and the key scheduling unit for the sake of convenience.

A register group 261 as in FIG. 6 represents a collection of registers that is equivalent to the circuit including the multiplexers m05 through m08 and 12 of the registers as in FIG. 5 r04 through r15, which stores 96 bits worth of data, so enabling the shift low to also be performed.

The operation of the matrix operation circuit 253 for executing the linear transformation processing applying a matrix will be described using FIG. 7. Let us assume that the calculation below will now be executed using the matrix operation circuit 253 illustrated in FIG. 7. Further, the calculation below is performed under the conditions of a finite volume GF ($2^8$).

[Math. 1]

$$\begin{pmatrix} y_0 \\ y_1 \\ y_2 \\ y_3 \end{pmatrix} = \begin{pmatrix} 2 & 3 & 1 & 1 \\ 1 & 2 & 3 & 1 \\ 1 & 1 & 2 & 3 \\ 3 & 1 & 1 & 2 \end{pmatrix} \begin{pmatrix} x_0 \\ x_1 \\ x_2 \\ x_3 \end{pmatrix}$$

Expression 1

Further, the ($x_0$, $x_1$, $x_2$, $x_3$) illustrated in Expression 1 correspond to the input into matrix operation circuit 253 (output from the S-box unit), and ($y_0$, $y_1$, $y_2$, $y_3$) corresponds to the output from the matrix operation circuit 253 (linear transformation result).

The 4×4 matrix corresponds to the matrix applied to the matrix operation circuit 253 (linear transformation matrix).

Further, the elements in the 4×4 linear transformation matrix are represented as hexadecimal values.

Each value of ($x_0$, $x_1$, $x_2$, $x_3$) in the present example represents 8-bit data which is the output per one cycle from the S-box 252. Each value of the output ($y_0$, $y_1$, $y_2$, $y_3$) is 8-bit data.

Figure 7:
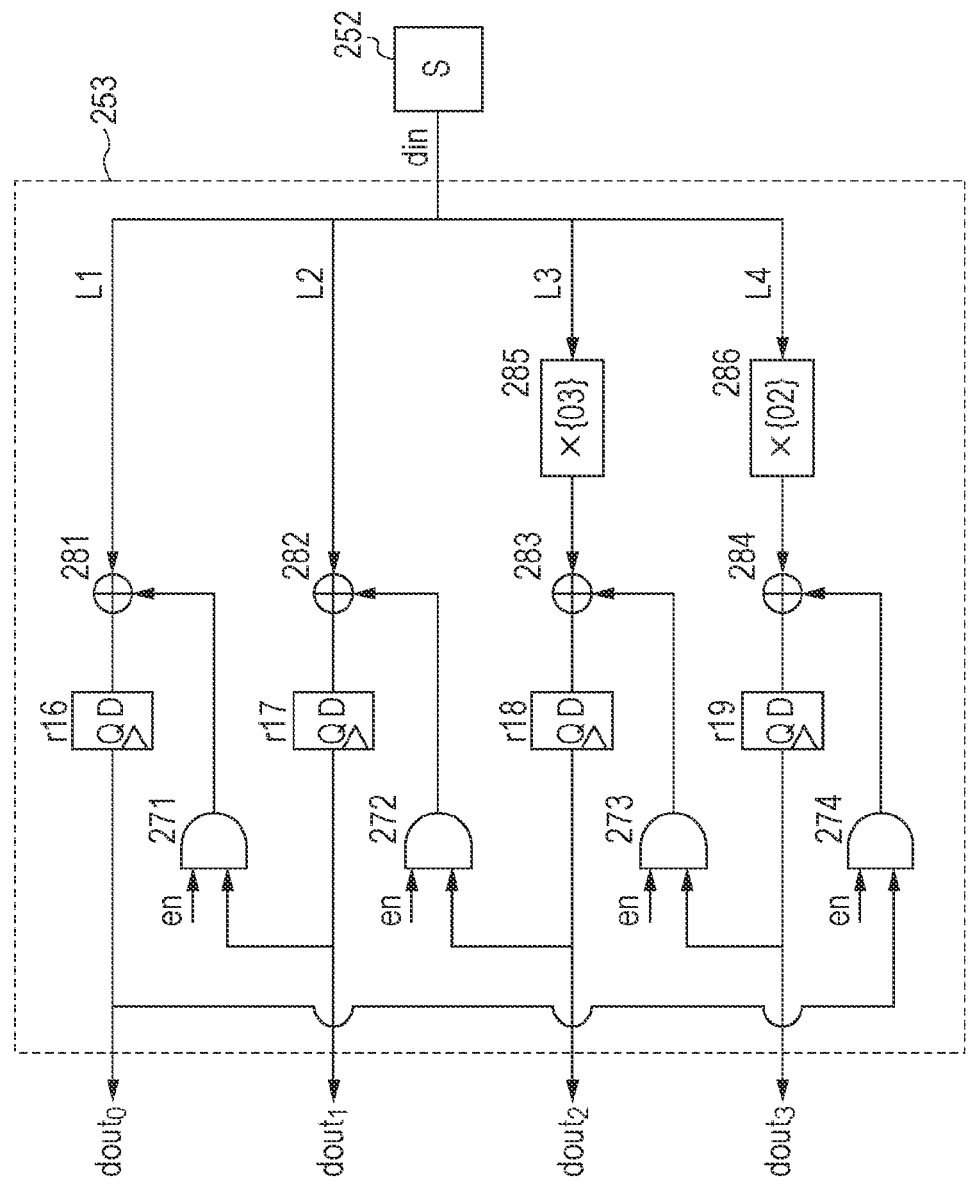
FIG. 7 is a diagram describing the operation of a matrix calculating circuit 253 for executing linear transformation processing applying a matrix.

Further, processing of the linear transform unit 203 comprised of the four matrix operation units illustrated in FIG. 4 is performed at the matrix operation circuit 253 illustrated in FIG. 7. Each of the four matrix operation units illustrated in FIG. 4 execute a linear transformation after inputting the output of each of the data (8-bit output) which have been non-linearly transformed by the four S-box units. However, according to the configuration illustrated in FIG. 5 and FIG. 7, the S-box units have been reduced to just the one S-box 252, so each cycle only produces S-box output equivalent to one of the 16 S-box units illustrated in FIG. 4.

Therefore, the output from the four S-box units illustrated in FIG. 4 which take 4 cycles to complete from the one S-box 252 ($x_0$, $x_1$, $x_2$, $x_3$) is input into the matrix operation circuit 253 as in FIG. 7.

For example, when the matrix operation processing is executed by the matrix transform unit 203a illustrated in FIG. 4 in the matrix operation circuit 253 as in FIG. 7, the S-box unit output (1) through (4) corresponding to the matrix operation circuit 203a illustrated in FIG. 4 is input into the matrix operation circuit 253 illustrated in FIG. 7 from the S-box 252 sequentially over four cycles.

The input from the S-box 252 into the matrix operation circuit 253 illustrated in FIG. 7 is as follows: data $x_0$ produced from a first cycle, data $x_1$ produced from a second cycle, data $x_2$ produced from a third cycle, and data $x_3$ produced from a fourth cycle.

The linear transformation result applying a matrix using this data is output as the ($y_0$, $y_1$, $y_2$, $y_3$).

This data transformation is performed by the matrix operation circuit 253 illustrated in FIG. 7 using a matrix, and the expression representing this transformation processing is the previously described Expression 1.

As previously described, each of the $x_0$, $x_1$, $x_2$, and $x_3$ output from each cycle of the S-box 252 is 8-bit data, and each of the $y_0$, $y_1$, $y_2$, and $y_3$ as the result of the linear transformation by the matrix operation circuit 253 applying a matrix is also 8-bit data.

Next, the processing that occurs during each cycle will be described.

The matrix operation circuit 253 illustrated in FIG. 7 inputs $x_0$, which is the input data (din) for the first cycle. As this point, enable signals (en) input into logical AND circuits 271 through 274 are set to zero. Further, control is performed by a control unit not illustrated in FIG. 5 through FIG. 7.

At the topmost line L1 illustrated in FIG. 7, the $x_0$, which is the input data (din), is directly stored in the register r16 passing through an XOR operation unit 281.

At the second line L2 as well, the $x_0$, which is the input data (din) is directly stored in the register r17 passing through an XOR operation unit 282.

At the third line L3 and the fourth line L4, the $x_0$, which is the input data (din), is multiplied by a previously specified value of either 2 or 3 at a finite volume. That is to say, the following multiplication is executed by multiplying units 285 and 286.

Calculations $X_0 \cdot 2$ and $X_0 \cdot 3$ are performed.

These calculation results are stored in registers r18 and r19 passing through XOR operation units 283 and 284.

Further, a multiplication unit is not configured for the first line L1 and the second line L2, but this is equivalent to multiplying the $x_0$, which is the input data (din) by a previously specified value of 1 at a finite volume.

The $x_1$, $x_2$, and $x_3$, which is the input data (din) are input for the second cycle, the third cycle, and the fourth cycle, respectively. The second cycle, third cycle, and fourth cycle are different from the first cycle in that the enable signal input into the logical AND circuits 271 through 274 is set to one.

With this configuration, the XOR operations are performed between the input data of the multiplication value and the output from the logical AND circuits 271 through 274 at the XOR operation units 281 through 284, and the results of which are stored in registers r16 through r19.

As a result of such processing, the results of calculations according to the above (Expression 1) are stored in registers r16 through r19 after completion of the four cycles. That is to say, $$(dout_0, dout_1, dout_2, dout_3) = (y_0, y_1, y_2, y_3).$$

In this way, the matrix operation is executed according to the previously described (Expression 1) by the matrix operation circuit 253 illustrated in FIG. 7 with the 4-cycle processing.

Further, the processing described with reference to FIG. 7 is a circuit that achieves linear transformation processing by a matrix operation of a cyclic matrix used by AES, but other linear transformation processing applying different matrices may be achieved by changing the configuration of the multiplying unit in the circuit, the connection configuration, and similar. For example, a circuit that achieves a matrix operation applying a Hadamard matrix as described below may be implemented by a matrix operation circuit 290 illustrated in FIG. 8.

[Math. 2]

$$\begin{pmatrix} y_0 \\ y_1 \\ y_2 \\ y_3 \end{pmatrix} = \begin{pmatrix} a & b & c & d \\ b & a & d & c \\ c & d & a & b \\ d & c & b & a \end{pmatrix} \begin{pmatrix} x_0 \\ x_1 \\ x_2 \\ x_3 \end{pmatrix} \quad \text{Expression 2}$$

Figure 8:
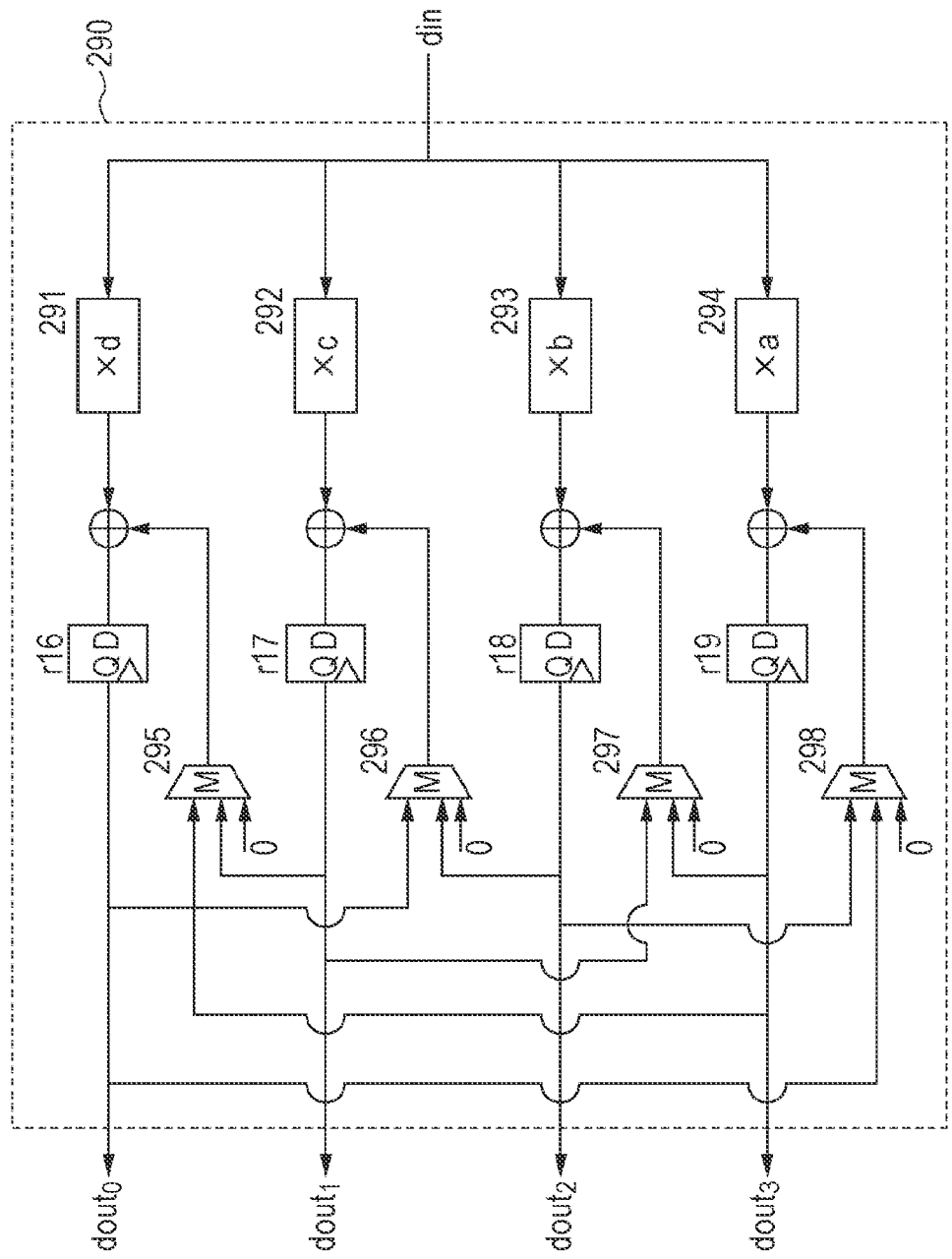
FIG. 8 is a diagram describing a matrix calculating circuit for generating matrix operations applying a Hadamard matrix.

Further, the $(x_0, x_1, x_2, x_3)$ illustrated in Expression 2 correspond to the input into the matrix operation circuit 290 illustrated in FIG. 8 (output from the S-box unit), and $(y_0, y_1, y_2, y_3)$ corresponds to the output from the matrix operation circuit 290 (linear transformation result).

The 4×4 matrix corresponds to the matrix applied to the matrix operation circuit 290 (linear transformation matrix).

Further, the elements in the 4×4 linear transformation matrix are represented as hexadecimal values.

The difference between the matrix operation circuit 290 that achieves a matrix operation applying the Hadamard matrix illustrated in FIG. 8 and the matrix operation circuit 253 that achieves the cyclic matrix illustrated in FIG. 7 may be illustrated with the following configuration.

Multiplying units 291 through 294 are configured to correspond to the linear transformation matrix elements comprised of the 4×4 Hadamard matrix illustrated in Expression 2.

The logical AND circuits are changed to multiplexers (Multiplexers) 295 through 298, and the input to each of the registers r16 through r19 is configured to be selected from one of three possibilities, the output from two other registers or zero.

These configurations are differentiating points.

The configuration to reduce the size of the AES encryption configuration using the SPN structure proposed by Hamalainen, et al. described with reference to FIG. 4 through FIG. 8 is achieved by reducing the number of S-box units to only one, and configuring the minimum number of registers.

The important registers applied to one round of the round calculation perform a simple calculation as illustrated below. However, the block size n which is the size of the data to be processed in the round calculation is set to 128 bits.

(1) 128-bit register for storing the round key
(2) 128-bit register for storing the processing data
(3) 32-bit register for storing the results of currently processing calculations regarding the matrix operation applying the linear transformation matrix Registers (2) and (3) are the minimum desired for the data calculation unit, which results in a desired minimum of 160 bits (128+38) worth of registers.

However, the configuration proposed by Hamalainen, et al. illustrated in FIG. 5 succeeds in having only 152 bits worth of registers, which is 8 bits less than the 160 bits just described (19 8-bit registers).

The configuration proposed by Hamalainen, et al. does not use the 8-bit value after being input into the matrix operation circuit from the S-box unit for the next round. Taking a further look at this configuration, the register for the first 8 bits of the 32 bits input into the matrix operation circuit from the S-box unit is a shared register within the matrix operation circuit, and so this 8-bit register is deleted.

4. Issues with Applying Reduced Size SPN Structures to Generalized Feistel Structures As previously described, Hamalainen, et al. have achieved a reduction in size of the SPN structure. However, this configuration to reduce size is a specialized configuration corresponding to SPN structures, and thus a sufficient reduction in size could not be attained when applying this configuration to reduce size to generalized Feistel structures. The related issues will be described next. Further, Feistel structures are included in the meaning of generalized Feistel structures for the following description.

If the configuration proposed by Hamalainen, et al. described with reference to FIG. 5 is simply applied to the configuration that executes an algorithm such as CLEFIA that has a generalized Feistel structure, a register has to be configured to store data at the bit length of the output from a matrix for the matrix operation. The generalized Feistel structure is different from the SPN structure, and the key difference here is the processing sequence in which the value input into the F function in the round function is used again in the next round.

Also, with generalized Feistel structures, after the F function calculation in the round function, an XOR operation is performed with another line, and this step does not exist with the SPN structure. For this reason, the bit lengths of lines in the generalized Feistel structures have to accommodate this circuit for performing this XOR operation.

Figure 9:
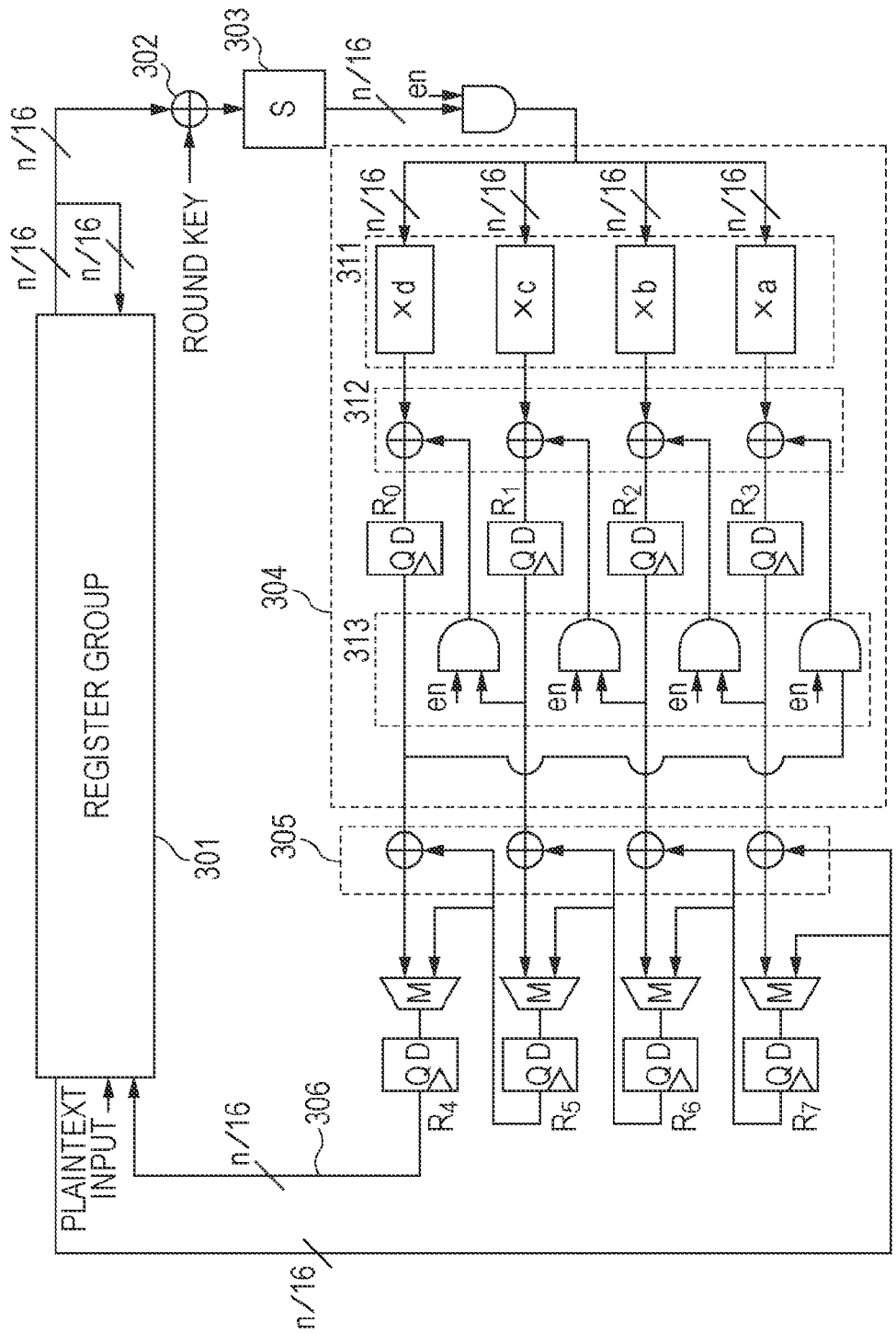
FIG. 9 is an overview of a data calculating circuit when the Hamalainen, et al. implementation method is applied to a 4-line generalized Feistel structure.

FIG. 9 is a diagram illustrating an overview of a data calculation unit circuit when applying the implementation method proposed by Hamalainen, et al. to the 4-line generalized Feistel structure. The AES data path in FIG. 9 is similar to that previously described with reference to FIG. 6, and the substitution operation and key sequencing unit at the time of the generalized Feistel structure round function completion is omitted.

Further, the block size functioning as the processing data size for the round operation is set to n bits. As previously described with reference to FIG. 3, according to the 4-line generalized Feistel structure, n/4-bit data is input into each of the four lines and sequentially transferred.

A register group 301 in FIG. 9 corresponds to the register group 261 illustrated in FIG. 6. However, the register group 301 illustrated in FIG. 9 corresponding to the 4-line generalized Feistel structure is configured with a combination of a register for storing data at a size of 3/4n bits and a multiplexer for executing a processing similar to the substitution operation at the time of the round function completion. That is to say, if data of a size 1/4n bits for one line is stored in the data calculation unit downstream in the register group 301, a register has to be configured to store data at a size of 3/4n bits.

Further, the calculation executed applying an encryption algorithm data path (calculation execution circuit) applying the 4-line generalized Feistel structure illustrated in FIG. 9 corresponds to the operation processing applying the 4-line generalized Feistel structure illustrated in FIG. 3.

This means that a round function is executed including an F function in the 4-line generalized Feistel structure illustrated in FIG. 3 using the data path illustrated in FIG. 9.

Figure 10:
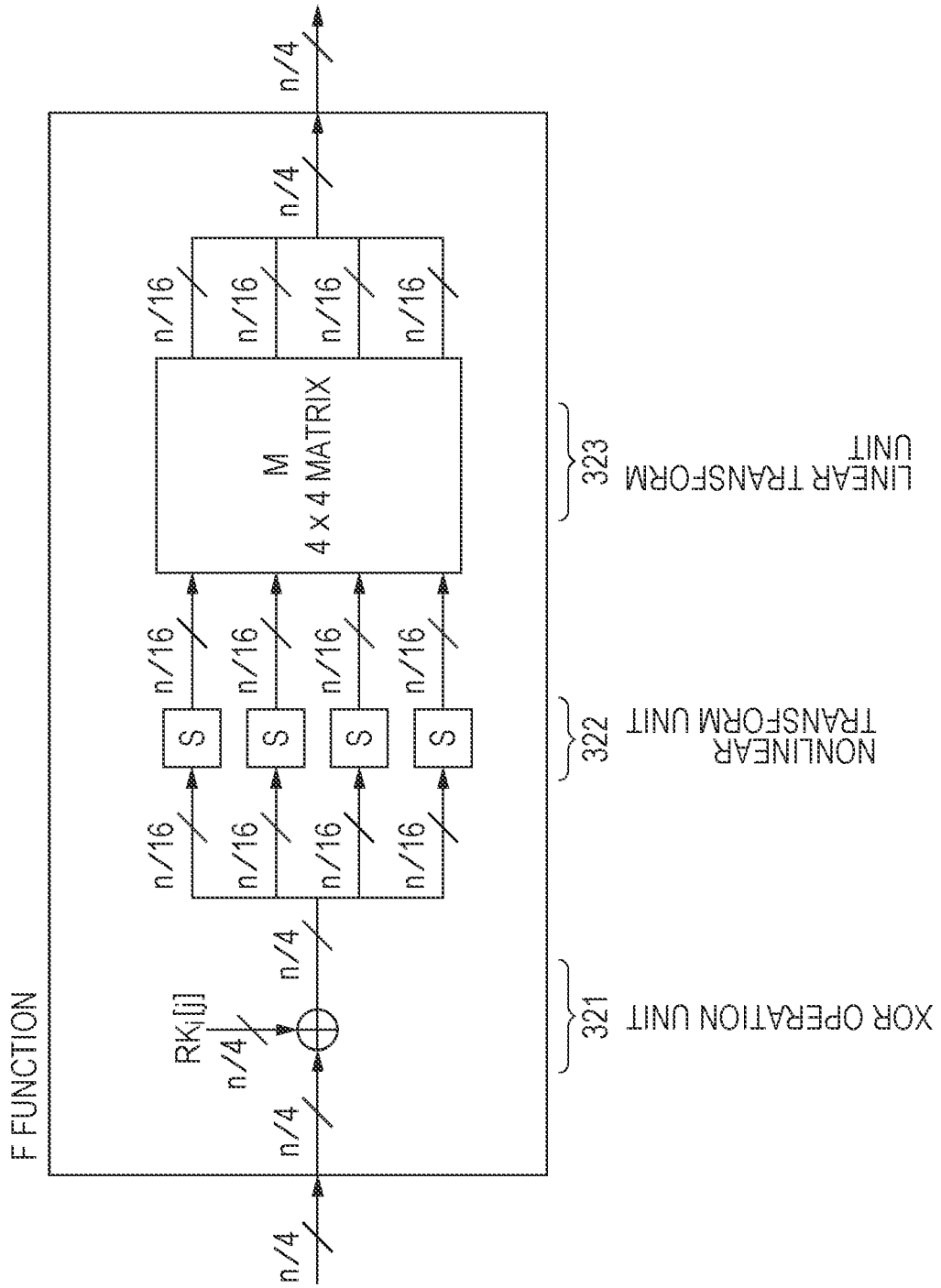
FIG. 10 is a diagram describing an example structure of an F function.

A specific example of the F function in the round function is illustrated in FIG. 10.

The F function illustrated in FIG. 10 has the following configuration elements similar to the F function of the Feistel structure previously described with reference to FIG. 2. These configuration elements include:

(a) an XOR operation unit 321 for executing XOR operations with round keys, (b) a non-linear transform unit [S] 322 comprised of S-box units for executing non-linear transformation processing against the output from the XOR operation unit 321, and (c) a linear transform unit [M] 323 for performing linear transformation processing by the matrix operation against the output of the non-linear transform unit [S] 322.

However, the input and output corresponding to the F function in the 4-line generalized Feistel structure has a size of n/4 bits.

Further, the matrix executed by the linear transform unit MS] 323 used for the matrix operation applied to the linear transformation processing is assumed to be a cyclic matrix with a first row of elements (a, b, c, d). That is to say, this matrix is illustrated in (Expression 3) as follows.

[Math. 3]

$$\begin{pmatrix} a & b & c & d \\ d & a & b & c \\ c & d & a & b \\ b & c & d & a \end{pmatrix} \quad \text{Expression 3}$$

The block configuration bit n, which is the processing unit, is set to $$n = 128\text{-bit}$$

so as to compare the configuration of the AES encryption algorithm applying the SPN structure previously described with reference to FIG. 4 through FIG. 8.

The circuit illustrated in FIG. 9 also has only one S-box unit similar to the circuit illustrated in FIG. 6. This circuit illustrated in FIG. 9 is labeled S-box 303. This S-box 303 executes one S-box processing for one cycle configured in the F function illustrated in FIG. 10. Each S-box processing illustrated in FIG. 10 is performed sequentially per cycle.

As illustrated in FIG. 10, non-linear transformation processing is executed after data of a size that is 1/4 of n/4 bits, that is to say data with a size of n/16 bits, used for transferring one line of the 4-line generalized Feistel structure is input into one S-box unit in the F function.

Data with a size of n/16 bits is input into the S-box 303 illustrated in FIG. 9 per cycle, and then the non-linear transformation processing is executed.

Further, according to the configuration in FIG. 9, data with a size of n/16 bits, which is the processing unit used by the S-box 303 for one cycle is output from the register group 301, and a non-linear transformation processing is first executed on this n/16-bit data by the S-box unit that performs an XOR operation with the round key configuration data via an XOR operation unit 302.

The data non-linearly transformed by the S-box 303 is next input into a matrix operation circuit 304 at one cycle intervals of the n/16-bit data. The matrix operation circuit 304 executes a linear transformation processing applying a predetermined matrix.

Next, the operation executing circuit excluding the register group 301 within the data path of the encryption algorithm applying the 4-line generalized Feistel structure illustrated in FIG. 9 will be compared with the operation circuit configuration executing the AES encryption processing using the SPN structure described with reference to FIG. 6.

According to the operation circuit illustrated in FIG. 6, there are seven 8-bit registers r01 through r03 and r16 through r19, and according to the operation circuit illustrated in FIG. 9, there are eight 8-bit registers R0 through R7. That is to say, the number of 8-bit registers is increased by one.

Also, the number of XOR operation circuits is also increased.

In this way, when applying the configuration proposed by Hamalainen, et al. to the generalized Feistel structure, in addition to the registers corresponding to the block length, a register for one line worth of data and an XOR operation circuit has to be added as per the operation circuit illustrated in FIG. 9.

The increase in registers has a large effect on the scale of the circuit, and so it would be desirable to create an implementation method to configure only registers corresponding to the block length.

Note that the gate size of the registers is relatively greater as compared to other cells, and increase of the number of registers greatly affects gate size. Accordingly, as one directionality to realize reduction in size, consideration an implementation method where increase in registers is suppressed, becomes important.

5. Structures to Achieve Size Reduction of Generalized Feistel Structures

Next, a configuration according to the present invention, that is to say, a configuration to reduce the size of generalized Feistel structures will be described.

As described in the previous section, registers and XOR operation circuits are increased when applying the implementation method proposed by Hamalainen, et al. to the configuration for executing an encryption algorithm having a generalized Feistel structure, which does not result in a reduction in size.

The difference between the encryption algorithm applying the SPN structure and the encryption algorithm applying the generalized Feistel structure is particularly that according to the configuration of the encryption algorithm applying the generalized Feistel structure, once the matrix operation result is obtained, an XOR operation is performed on another line.

That is to say, with the encryption algorithm applying the generalized Feistel structure, both registers for storing the results during matrix operations and registers for storing other line data have to be configured.

Also, according to the encryption algorithm applying the generalized Feistel structure, once the matrix operation for one line of data finishes, a matrix operation for a new line of the next cycle (cycle) starts. For this reason, an XOR operation on another line has to be performed between this one cycle. Thus, a circuit for XOR operations of one line has to be configured.

The configuration according to the present invention described as follows uses the associative law regarding XOR operations, that is to say, the following expression as formed below, and thus is able to delete important registers by changing the operation sequence.

[Math. 4]

$$(a \oplus b) \oplus c = a \oplus (b \oplus c) \quad \text{Expression 4}$$

Though the order of the XOR operation is changed, the above Expression 4 still obtains the same result. According to the present invention, changing the operation order enables the deletion of important registers using this law.

Specifically, the operation order is changed in that an XOR operation is performed on the results of the matrix operation still processing stored in a register, which is storing data for another line. By changing the operation order in this way, the results of the matrix operation still processing do not have to be stored, which enables a reduction in the number of registers.

Figure 11:
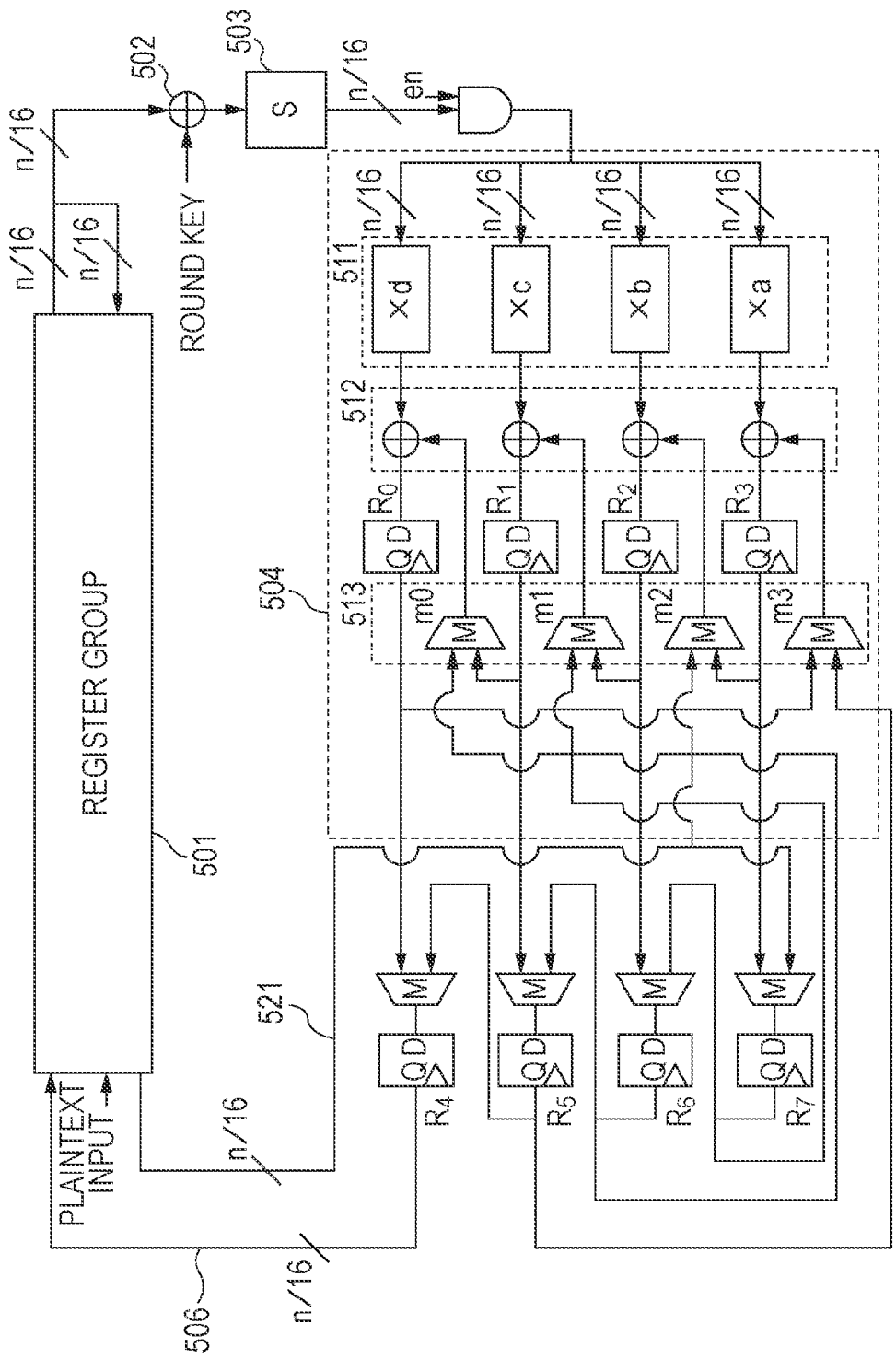
FIG. 11 is a diagram illustrating a data path as an embodiment of the present invention, that is to say, a calculating circuit structure.

FIG. 11 illustrates a data path functioning as an embodiment of the present invention, that is to say, an operation circuit configuration. The operation circuit illustrated in FIG. 11 is a circuit for executing an encryption algorithm applying the 4-line generalized Feistel structure previously described with reference to FIG. 3. Specifically, the circuit may be used to execute CLEFIA encryption by replacing the cyclic matrix operation unit with a Hadamard matrix operation unit.

Further, the circuit illustrated in FIG. 11 is similar to that of FIG. 9 in which the configuration of the circuit for executing the substitution operation at the time the round function in the 4-line generalized Feistel structure finishes and the key scheduling unit is omitted.

A register group 501 as in FIG. 11 corresponds to the register group 301 illustrated in FIG. 9. That is to say, the register group 501 is configured with a circuit having a function to execute the substitution operation at the time the round function finishes and a register for storing data.

However, the register group 501 as in FIG. 11 is configured with a smaller number of registers than the register group 301 illustrated in FIG. 9.

As previously described, the register group 301 illustrated in FIG. 9 is configured to include a circuit having registers to store 3/4n-bit size data and a function for executing the substitution operation at the time the round function finishes.

In contrast, the registers included in the register group 501 illustrated in FIG. 11 only store n/2-bit size data.

The bit number n for the block size of the processing data, that is to say, the bit number: n for the block size functioning as an the encryption processing unit applying the 4-line generalized Feistel structure is $n$=128 bits.

With this setting, according to the configuration as in FIG. 9 previously described, registers of 96+64=160-bit as the sum of (3/4n) 1-bit=96-bit in the register group 301, and eight 8×8=64-bit in operation units other than the register group 301 are necessary.

In contrast, according to the configuration as in FIG. 11 applying the method of the technique according to the present invention, 64+64=128-bit as the sum of (1/2) n-bit=64-bit in the register group 501, and eight 8×8=64-bit in operation units other than the register group 301 are necessary.

That is to say, the reduction of significant registers is achieved as only 128 bits of registers are configured in the configuration of the present invention for the operation circuit applying the 4-line generalized Feistel structure illustrated in FIG. 11 in comparison to the 160 bits of registers configured in the configuration as in FIG. 9 when taking the implementation method proposed by Hamalainen, et al. corresponding to the SPN structure and simply applying this to the 4-line generalized Feistel structure.

Compared to the configuration as in FIG. 9, 32 bits of registers are removed by the configuration of the present invention with the operation circuit applying the 4-line generalized Feistel structure illustrated in FIG. 11.

This will be described in detail next, but the reduction with the configuration of the present invention illustrated in FIG. 11 is achieved by preemptively executing the operation using the output from another line ($E_0$, $E_1$, $E_2$, $E_3$) and thus removing the four 8-bit registers (32 bits) for storing this output data ($E_0$, $E_1$, $E_2$, $E_3$) during the matrix operation.

The operation sequence enabling the removal of these registers will be described in detail now.

A special configuration regarding the processing of the present invention is implemented for the operation sequence applying a matrix in the matrix operation circuit for performing linear transformations in order to reduce the number of registers. The operation sequence applying a circuit configuration as represented by the data path of the present invention as illustrated in FIG. 11 will be described in detail next.

FIG. 12 and the following table 1 illustrated the matrix operation sequence for the matrix operation circuit 304 following the data path illustrated in FIG. 9.

Further, FIG. 13 and the following table 2 illustrate the matrix operation sequence for a matrix operation circuit 504 following the data path illustrated in FIG. 11.

TABLE 1

| | First cycle | Second cycle | Third cycle | Fourth cycle | Fifth cycle |
|---|---|---|---|---|---|
| $R_0$ | $d \cdot x_0$ | $c \cdot x_0 \oplus d \cdot x_1$ | $b \cdot x_0 \oplus c \cdot x_1 \oplus d \cdot x_2$ | $y_0$ | $d \cdot x'_0$ |
| $R_1$ | $c \cdot x_0$ | $b \cdot x_0 \oplus c \cdot x_1$ | $a \cdot x_0 \oplus b \cdot x_1 \oplus c \cdot x_2$ | $Y_1$ | $c \cdot x'_0$ |
| $R_2$ | $b \cdot x_0$ | $a \cdot x_0 \oplus b \cdot x_1$ | $d \cdot x_0 \oplus a \cdot x_1 \oplus b \cdot x_2$ | $Y_2$ | $b \cdot x'_0$ |
| $R_3$ | $a \cdot x_0$ | $d \cdot x_0 \oplus a \cdot x_1$ | $c \cdot x_0 \oplus d \cdot x_1 \oplus a \cdot x_2$ | $Y_3$ | $a \cdot x'_0$ |
| $R_4$ | — | — | — | — | $E_0 \oplus y_0$ |
| $R_5$ | — | — | — | $E_0$ | $E_1 \oplus y_1$ |
| $R_6$ | — | — | $E_0$ | $E_1$ | $E_2 \oplus y_2$ |
| $R_7$ | — | $E_0$ | $E_1$ | $E_2$ | $E_3 \oplus y_3$ |

TABLE 2

| | First cycle | Second cycle | Third cycle | Fourth cycle | Fifth cycle |
|---|---|---|---|---|---|
| $R_0$ | $E_1 \oplus d \cdot x_0$ | $E_2 \oplus c \cdot x_0 \oplus d \cdot x_1$ | $E_3 \oplus b \cdot x_0 \oplus c \cdot x_1 \oplus d \cdot x_2$ | $E_0 \oplus y_0$ | $E'_1 \oplus d \cdot x'_0$ |
| $R_1$ | $E_2 \oplus c \cdot x_0$ | $E_3 \oplus b \cdot x_0 \oplus c \cdot x_1$ | $E_3 \oplus a \cdot x_0 \oplus b \cdot x_1 \oplus c \cdot x_2$ | $E_1 \oplus Y_1$ | $E'_2 \oplus c \cdot x'_0$ |
| $R_2$ | $E_3 \oplus b \cdot x_0$ | $E_0 \oplus a \cdot x_0 \oplus b \cdot x_1$ | $E_1 \oplus d \cdot x_0 \oplus a \cdot x_1 \oplus b \cdot x_2$ | $E_2 \oplus Y_2$ | $E'_3 \oplus b \cdot x'_0$ |

TABLE 2-continued

| | First cycle | Second cycle | Third cycle | Fourth cycle | Fifth cycle |
|---|---|---|---|---|---|
| $R_3$ | $E_0 \oplus a \cdot x_0$ | $E_1 \oplus d \cdot x_0 \oplus a \cdot x_1$ | $E_2 \oplus c \cdot x_0 \oplus d \cdot x_1 \oplus a \cdot x_2$ | $E_3 \oplus Y_3$ | $E'_0 \oplus a \cdot x'_0$ |
| $R_4$ | — | — | — | — | $E_0 \oplus y_0$ |
| $R_5$ | — | — | — | $E'_0$ | $E_1 \oplus y_1$ |
| $R_6$ | — | — | $E'_0$ | $E'_1$ | $E_2 \oplus y_2$ |
| $R_7$ | — | $E'_0$ | $E'_1$ | $E'_2$ | $E_3 \oplus y_3$ |

The difference between each processing will be described using Table 1 (FIG. 12) illustrating the matrix operation sequence for the configuration illustrated in FIG. 9 and Table 2 (FIG. 13) illustrating the matrix operation sequence for the configuration illustrated in FIG. 11.

First, a matrix operation sequence used when the implementation method proposed by Hamalainen, et al. corresponding to the SPN structure is simply applied to the 4-line generalized Feistel structure is described with reference to FIG. 9 and FIG. 12 (Table 1).

Let us assume that the output data ($x_0$, $x_1$, $x_2$, $x_3$) from the S-box 303 is sequentially input into the matrix operation circuit 304 following the data path illustrated in FIG. 9, in which a linear transformation processing applying a matrix is performed.

The matrix operation circuit 304 outputs the output generated by the matrix operation applying a matrix ($y_0$, $y_1$, $y_2$, $y_3$) to an XOR operation unit 305.

The XOR operation unit 305 performs an XOR operation on the output from the matrix operation circuit 304 ($y_0$, $y_1$, $y_2$, $y_3$) and the output from another line in the 4-line generalized Feistel structure ($E_0$, $E_1$, $E_2$, $E_3$). The output from another line ($E_0$, $E_1$, $E_2$, $E_3$) is, for example, equivalent to the processing result of the round operation from the previous round.

Further, each of portion of the input into the matrix operation circuit 304 ($x_0$, $x_1$, $x_2$, $x_3$) has a size of n/16 bits, and each portion the output ($y_0$, $y_1$, $y_2$, $y_3$) as well as the output from another line ($E_0$, $E_1$, $E_2$, $E_3$) has a size of n/16 bits.

At this time, the values stored in the registers $R_0$, $R_1$, ..., $R_7$ illustrated in FIG. 9 are changed as illustrated in FIG. 12 and Table 1.

Each element of the matrix operation result based on the input element $x_0$ input into the matrix operation circuit 304 is stored in the registers $R_0$, $R_1$, $R_2$, and $R_3$ during the first cycle (1 cycle). At this timing, the enable signal (en) input in a logical AND circuit 313 is set to zero, and the multiplication result produced by a multiplication unit 311 based on the input element $x_0$ is stored in the registers $R_0$, $R_1$, $R_2$, and $R_3$, that is,
the stored value in the register $R_0$ is the result of (d·$x_0$),
the stored value in the register $R_1$ is the result of (c·$x_0$),
the stored value in the register $R_2$ is the result of (b·$x_0$), and
the stored value in the register $R_3$ is the result of (a·$x_0$).

Afterwards, the input element $x_1$ is input into the matrix operation circuit 304 for the second cycle. During the second through fourth cycles, the enable signal (en) input into the logical AND circuit 313 is set to one, and an XOR operation unit 312 executes an XOR operation on the multiplication result produced by the multiplication unit 311 based on the input element $x_1$ and the values stored in the registers $R_0$, $R_1$, $R_2$, and $R_3$ from the previous cycle, and the result of which is newly stored in the registers $R_0$, $R_1$, $R_2$, and $R_3$.

Also, the output element $E_0$ from another line is stored in the register $R_7$ during this second cycle.

The input element $x_2$ is input into the matrix operation circuit 304 for the third cycle. During the second through fourth cycles, the enable signal (en) input into the logical AND circuit 313 is set to one, and an XOR operation unit 312 executes an XOR operation on the multiplication result produced by the multiplication unit 311 based on the input element $x_2$ and the values stored in the registers $R_0$, $R_1$, $R_2$, and $R_3$ from the previous cycle, and the result of which is newly stored in the registers $R_0$, $R_1$, $R_2$, and $R_3$.

Also, the output element $E_0$ from another line is stored in the register $R_6$ and the element $E_1$ is stored in the register $R_7$ during this third cycle.

The input element $x_3$ is input into the matrix operation circuit 304 for the fourth cycle. The input of all input data ($x_0$, $x_1$, $x_2$, $x_3$) completes, and the matrix operation results ($y_0$, $y_1$, $y_2$, $y_3$) is stored in the registers $R_0$, $R_1$, $R_2$, and $R_3$ during the fourth cycle.

For the next or fifth cycle, the XOR operation unit 305 performs an XOR operation on the output from another line ($E_0$, $E_1$, $E_2$, $E_3$) and the ($y_0$, $y_1$, $y_2$, $y_3$), which are the matrix operation results produces by the matrix operation circuit 304 applying a matrix (linear transformation results), and the values for the results of which are stores in the registers $R_4$, $R_5$, $R_6$, and $R_7$.

The values stored in the registers, that is to say, the data illustrated in (Expression 5) below, are input through a line 306 illustrated in FIG. 9 into the register group 301 as data to be used in the next round operation.

[Math. 5]

$$E_0 \oplus y_0$$

$$E_1 \oplus y_1$$

$$E_2 \oplus y_2$$

$$E_3 \oplus y_3 \qquad \text{Expression 5}$$

Further, the values illustrated in (Expression 5) above are equivalent to the round output data (D) from the connection unit between rounds illustrated in FIG. 3.

Also, with the fifth cycle, the operation of the first element $x'_0$ in the next input values ($x'_0$, $x'_1$, $x'_2$, $x'_3$) into the matrix operation circuit 304 is stored in the registers $R_0$, $R_1$, $R_2$, and $R_3$.

Next, the transfer process in units of cycles of matrix operations performed by a matrix operation circuit 504 using the data path according to the present invention illustrated in FIG. 11 will be described with reference to FIG. 11 and FIG. 13 (Table 2).

The data ($x_0$, $x_1$, $x_2$, $x_3$) as the output from a S-box unit 503 similar to that described with reference to FIG. 9 is sequentially input into the matrix operation circuit 504 following the data path illustrated in FIG. 11, and a linear transformation processing is performed applying a matrix.

If the matrix operation is performed using the configuration illustrated in FIG. 11, the data to be used for the next round [is stored] in the registers $R_0$, $R_1$, $R_2$, and $R_3$ during the fourth cycle as illustrated in FIG. 13 (Table 2), that is,

[Math. 6]

$E_0 \oplus y_0$ $E_1 \oplus y_1$ $E_2 \oplus y_2$ $E_3 \oplus y_3$ \hfill Expression 6

Note that the values illustrated in (Expression 6) above are stored. These values are stored in the registers $R_4$, $R_5$, $R_6$, and $R_7$ during the fifth cycle, and are input through a line 506 into the register group 501 as the data to be used for the next round.

The configuration illustrated in FIG. 11 has a smaller number of registers than the configuration illustrated in FIG. 9, and yet produces the same operation processing result as that illustrated in FIG. 9. The operation sequence is different, however.

Each cycle in this processing will be described now.

According to the processing using the data path illustrated in FIG. 11, the output from another line equivalent to, for example, the processing result of the round operation from the previous round ($E_0$, $E_1$, $E_2$, $E_3$) is sequentially stored move from the register group 501 through an output line 521 and stored in the registers $R_7$, $R_6$, and $R_5$. The cycle (cycle 0) previous to the first cycle illustrated in FIG. 13 (Table 2) is configured to a state in which $E_0$ is stored in register $R_5$, $E_1$ is stored in register $R_6$, and $E_2$ is stored in register $R_7$.

During the first cycle, the output ($E_0$, $E_1$, $E_2$, $E_3$), which is sum of the $E_0$, $E_1$, $E_2$ values stored in their respective registers and the new output value $E_3$ output from the register group 501 through the output line 521, are input into an XOR operation unit 512. Further, the control of these operations is performed by a control unit not illustrated or a control based on clock input information.

The XOR operation unit 512 executes an XOR operation on these output values ($E_0$, $E_1$, $E_2$, $E_3$) and the multiplication result produced by the multiplication unit 311 based on the input element $x_0$, that is, $d \cdot x_0$, $c \cdot x_0$, $b \cdot x_0$, $a \cdot x_0$ the results of this XOR operation are stored in the registers $R_0$, $R_1$, $R_2$, and $R_3$.

That is to say, the value $E_1$ stored in the register $R_6$ is input into the XOR operation unit 512 through a multiplexer m0, in which the XOR operation result of ($d \cdot x_0$) is stored in the register $R_0$.

The value $E_2$ stored in the register $R_7$ is input into the XOR operation unit 512 through a multiplexer m1, in which the XOR operation result of ($c \cdot x_0$) is stored in the register $R_1$.

The value $E_3$ output from the register group through the output line 521 is input into the XOR operation unit 512 through a multiplexer m2, in which the XOR operation result of ($b \cdot x_0$) is stored in the register $R_2$.

The value $E_0$ stored in the register $R_5$ is input into the XOR operation unit 512 through a multiplexer m3, in which the XOR operation result of ($a \cdot x_0$) is stored in the register $R_3$.

That is to say, each value illustrated in (Expression 7) below is stored in the registers $R_0$, $R_1$, $R_2$, and $R_3$.

[Math. 7]

$E_1 \oplus d \cdot x_0$ $E_2 \oplus c \cdot x_0$ $E_3 \oplus b \cdot x_0$ $E_0 \oplus a \cdot x_0$ \hfill Expression 7

Further, a multiplexer 513 (m0 through m3) performs the same processing as a selector that outputs one input selected from two inputs.

The values stored in the registers $R_7$, $R_6$, and $R_5$ and the output value from the output line 521 are configured to be output during the first cycle. Further, this is controlled by a control unit not illustrated.

According to the configuration of the present invention, at the input timing of the input $x_0$ from the S-box 503 into the matrix operation circuit 504 illustrated in FIG. 11 during the first cycle, an XOR operation is performed on the output from another line ($E_0$, $E_1$, $E_2$, $E_3$) equivalent to the processing result of the round operation for the previous round for example, and the result of which is stored in the registers $R_0$, $R_1$, $R_2$, and $R_3$ in this way.

According to the configuration of the present invention, an XOR operation is preemptively performed on the output from another line ($E_0$, $E_1$, $E_2$, $E_3$) in this way. As a result, the output from another line ($E_0$, $E_1$, $E_2$, $E_3$) does not have to be stored until the matrix operation period over the four cycles completes. This processing change in the operation sequence enables the reduction in the number of important registers.

Afterwards, the input element $x_1$ is input into the matrix operation circuit 504 for the second cycle. During the second through fourth cycles, the multiplexer 513 (m0 through m3) is controlled select and output the values stored in the registers $R_0$, $R_1$, $R_2$, and $R_3$.

As a result, the XOR operation unit 512 executes an XOR operation on the multiplication result produced by a multiplication unit 511 based on the input element $x_1$ and the values stored in the registers $R_0$, $R_1$, $R_2$, and $R_3$ during the previous cycle, and the results of which are newly stored in the registers $R_0$, $R_1$, $R_2$, and $R_3$.

Also, the output element $E'_0$ from another line is stored in the register $R_7$ during this second cycle.

The input element $x_2$ is input into the matrix operation circuit 504 for the third cycle. The XOR operation unit 512 executes an XOR operation on the multiplication result produced by a multiplication unit 511 based on the input element $x_2$ and the values stored in the registers $R_0$, $R_1$, $R_2$, and $R_3$ during the previous cycle, and the results of which are newly stored in the registers $R_0$, $R_1$, $R_2$, and $R_3$.

Also, the output element $E'_0$ from another line is stored in the register $R_6$ during this third cycle, and $E'_1$ is stored in the register $R_7$.

The input element $x_3$ is input into the matrix operation circuit 504 for the fourth cycle. The input of all input data ($x_0$, $x_1$, $x_2$, $x_3$) completes, and the XOR operation results on the matrix operation results ($y_0$, $y_1$, $y_2$, $y_3$) and the output from another line ($E_0$, $E_1$, $E_2$, $E_3$) is stored in the registers $R_0$, $R_1$, $R_2$, and $R_3$ during the fourth cycle.

For the next or fifth cycle, the output from the next other line ($E'_0$, $E'_1$, $E'_2$, $E'_3$) are input into the XOR operation unit 512 as the values stored in the registers $R_7$, $R_6$, and $R_5$ and the output from the output line 521.

The XOR operation unit 512 performs the XOR operation on this input and the multiplication result produced by the multiplication unit 511 based on the input element $x'_0$ newly input into the matrix operation circuit 504, and stores the result of which into the registers $R_0$, $R_1$, $R_2$, $R_3$.

At this timing, the values stored in the registers $R_0$, $R_1$, $R_2$, $R_3$ are stored in the registers $R_4$, $R_5$, $R_6$, $R_7$.

The values stored in the registers, that is to say, the data illustrated in (Expression 8) below, are input through the line 506 illustrated in FIG. 10 into the register group 501 as data to be used in the next round operation.

[Math. 8]

$$E_0 \oplus y_0$$

$$E_1 \oplus y_1$$

$$E_2 \oplus y_2$$

$$E_3 \oplus y_3 \quad \text{Expression 8}$$

Regarding the configuration according to the present invention, preemptively executing the XOR operation on the output from another line ($E_0$, $E_1$, $E_2$, $E_3$) during the matrix operation processing eliminates having to separately configure independent registers for storing the output from another line ($E_0$, $E_1$, $E_2$, $E_3$) and the registers for storing the results of the matrix operation in progress, and so these registers are shared to reduce the number of important registers.

6. Advantageous Effects and Modifications of Configurations Regarding the Present Invention As previously described, according to the data path for executing the encryption processing applying a generalized Feistel structure according to the present invention illustrated in FIG. 11, the configuration is such that the XOR operation processing is executed during the first cycle of the matrix operation regarding the round operation of the previous processing result.

That is to say, the XOR operation is preemptively executed on the output from another line ($E_0$, $E_1$, $E_2$, $E_3$) equivalent to the processing result of the round operation for the previous round, for example.

As described with reference to FIG. 11, the output from another line ($E_0$, $E_1$, $E_2$, $E_3$) is preemptively input from registers or the like into the XOR operation unit 512 through the multiplexer 513 during the first cycle in which the matrix operation circuit 504 begins to execute the matrix operation processing, where the XOR operation processing is executed with the multiplication result ($d \cdot x_0$, etc.) produced by the multiplication unit 511 based on the first input value ($x_0$) for the matrix operation circuit 504.

According to the configuration of the present invention, by implementing the multiplexers (Multiplexers) for one line worth of data ((n/16)×4 in the present embodiment) in this way, one line worth of registers important for the configuration illustrated in FIG. 9, one line worth of XOR operations, and one line worth of logical AND circuits may be eliminated. According to the configuration illustrated in FIG. 11, a reduction in size may be performed equivalent to this difference.

Also, lower power consumption may be expected along with this reduction in size.

In particular, the gate size of the registers is relatively larger when compared to other cells, the reduction of one line worth of registers contributes remarkably to the reduction in size.

Further, according to the previously described embodiment, a representative example of a configuration applying the present invention was described being applied to a 4-line generalized Feistel structure. However, the processing sequence described with reference to FIG. 11 and FIG. 13 (Table 1), that is to say, the preemptive application the output values from another line to the matrix operation may be applied generalized Feistel structures other than a 4-line model and Feistel structures, and so registers and other circuit configurations may be eliminated similar to that described with reference to FIG. 11. That is to say, the present invention is applicable to not only 4-line generalized Feistel structures but also extended configuration with different round function internal components, 2-line Feistel structures, and x-line generalized Feistel structures, in which x is an arbitrary natural number more than two.

Also, according to the embodiment previously described, the example was described using a cyclic matrix as the matrix applied to the matrix operation circuit, but the matrix applied to the matrix operation circuit is not limited to cyclic matrices, other types of matrices such as the Hadamard matrix, for example, may be applied.

Further, the matrix applied to the matrix operation circuit is not limited to a 4×4 matrix, the matrix may be any arbitrary size in the format of x×x as long as x is any natural number of at least two.

Also, the configuration having the F function previously described with reference to FIG. 2 is not limited thusly, if the algorithm executes a round function that does not include a non-linear transformation after the matrix operation, the configuration of the present invention may still be applied with the expected effect of a similar reduction in size.

Further, though the configuration described using the previously described embodiment includes the 4-line generalized Feistel structure, which is an example of a type 2 generalized Feistel structure, the present invention may also be applied to other type 1 and type 3 generalized Feistel structures with the expected similar effect.

Figure 14:
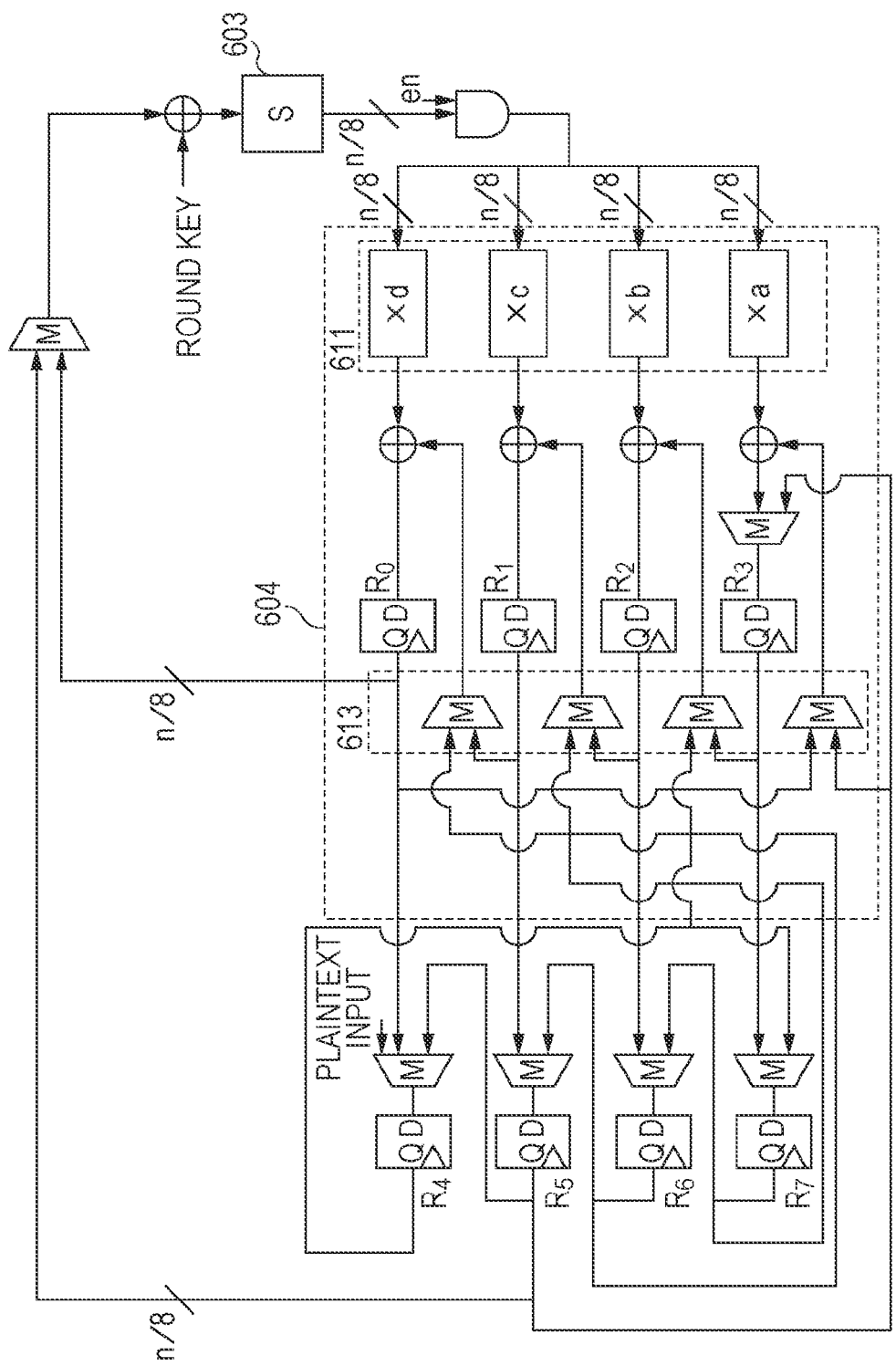
FIG. 14 is a diagram describing a circuit structure example as a data path applying the present invention regarding a two-line Feistel structure.

FIG. 14 illustrates a circuit configuration example functioning as a data path applying the present invention corresponding to a 2-line Feistel structure.

The data path illustrated in FIG. 14 stores the output from another line ($E_0$, $E_1$, $E_2$, $E_3$) into the registers $R_4$, $R_5$, $R_6$, $R_7$ as the operation results from the previous round, executes an XOR operation on the input value $x_0$ from an S-box 603 for the first cycle (first cycle) in which a first matrix operation circuit 604 begins to process the matrix operation and the multiplication value produced by a multiplication unit 611, and stores the result of which into the registers $R_0$, $R_1$, $R_2$, and $R_3$.

In this way, a matrix operation using a similar processing sequence to that previously described with reference to FIG. 11 may be executed, and as a result of this processing, the number of registers may be reduced enabling a reduction in size of a hardware configuration.

Specifically, when implementing the configuration as in FIG. 14 and configuring the data path of the 2-line Feistel structure according to a configuration similar to that as in FIG. 9, for example, registers for matrix operations equivalent to n/2 bits worth of data do not have to be configured, and so a total configuration of only an n-bit worth of registers may be implemented.

Further, when the configuration is the 2-line Feistel structure illustrated in FIG. 14, the matrix applied to the matrix operation circuit 604 may be a cyclic matrix, Hadamard matrix, or other type of matrix, and a matrix of an arbitrary size is a format of x×x may be used as long as x is an integer greater than or equal to two. Also, the configuration having an F function as described with reference to FIG. 2 is not limited thusly, and the present invention may be applied if the round function does not execute a non-linear transformation after the matrix operation.

7. Example Configuration of Encryption Processing Device as an IC Card

Lastly, FIG. 15 illustrates a configuration example of an IC module 700 as an encryption processing device executing an encryption processing according to the embodiment previously described. The processing previously described may be executed in various information processing devices such as PCs, IC cards, card readers/writers, and others, and the IC module 700 illustrated in FIG. 15 may be configured in these various devices.

A CPU (central processing unit) 701 illustrated in FIG. 15 starts and stops the encryption processing, controls the sending and receiving of data, controls the transfer between the configuration components, and executes other types of programs. A memory 702 is comprised of such components as a ROM (Read-Only-Memory) for storing the program executed by the CPU 701 and fixed data such as operational parameters, and a RAM (Random Access Memory) used as a storage area and workspace for the program executed by the processing of the CPU 701 and parameters arbitrarily changed during program processing. Also, the memory 702 may be used as a storage area for key data necessary for encryption processing, transformation tables (substitution tables) applied during the encryption processing, data applied to transformation matrices, and so on. Further, the data storage area is preferably configured as a memory having a tamper resistant configuration.

An encryption processing unit 703 executes the encryption processing configuration, for example, as described with reference to FIG. 11 and FIG. 14, that is to say, an encryption processing and decryption processing according to a shared key block encryption processing algorithm applying a generalized Feistel structure or Feistel structure.

Further, the example illustrated the encryption processing method as individual modules here, but instead of configuring these kind of independent encryption processing modules, a configuration may be implemented in which the encryption processing program is stored in ROM, and the CPU 701 reads and executes the program stored in ROM, for example.

A random number generating unit 704 executes processing to generate random numbers used for the generation of keys important in the encryption processing.

A transmission/reception unit 705 is a data transmission processing unit for executing data transmission with external devices, executes data transmission with card readers/writers, IC modules, etc., and executes output of ciphertext generated within the IC module or data input from external devices such as card readers/writers, etc.

This concludes the detailed description of the present invention with reference to specific embodiments. However, it should be understood by those skilled in the art that various modifications and substitutions may be made insofar as they are within the scope of the present invention. That is to say, the present invention was disclosed using embodiments as examples, and this should not be interpreted as limiting the present invention. The claims should be referenced to determine the scope of the present invention.

Further, the series of processing described in the specification may be executed by hardware, software, or some combination thereof. When executing the processing with software, the program to which the processing sequence is recorded may be installed on and executed from a memory internal to a computer assembled from specialized hardware, or may be a program installed to and executed from a general-purpose computer capable of executing various processing.

For example, the program may be previously recorded on a recording medium such as a hard disk or ROM (Read Only Memory). Conversely, the program may be temporarily or permanently stored on (recorded to) removable recording media such as a flexible disk, CD-ROM (Compact Disc Read Only Memory), DVD (Digital Versatile Disc), MO (Magneto optical) disk, magnetic disk, and semiconductor memory. This kind of removable media may be provided as so-called packaged software.

Further, in addition to being installed on a computer from a removable recoding medium as previously described, the program may be transferred wirelessly from a download site to a computer, or may be transferred to a computer via a wired connection to a network such as a LAN (Local Area Network) or the Internet, the program being transferred thusly is received on a computer, which then may be installed on a recording medium in the computer such as on a hard disk.

Further, the various processing described in the specification is not limited to being executed serially according to the description, and may be executed in parallel or individually depending on the processing capabilities of the device to execute the processing or as desired. Also, the system in the present specification is a configuration of a logical collection of multiple devices, and thus is not limited to a configuration in which each configuration device is installed in the same chassis.

INDUSTRIAL APPLICABILITY

As previously described, the configuration of the embodiment of the present invention enables a reduction in size and lower power consumption of an encryption processing configuration applying a generalized Feistel structure.

Specifically, an encryption processing configuration applying a generalized Feistel structure in which data is divided and input into multiple lines, and data transformation processing is repeatedly executed applying a round function on the data transferred into each line, wherein during an execution cycle of matrix operation in which a matrix operation executing unit executes a linear transformation processing applying a matrix to the data in a first line, an operation is performed on the matrix operation process data in a first cycle and the data for a second line. This configuration enables a register to be used for both the storage of the data for the second line and the storage of the results of the matrix operation on the first line of data in progress, a reduction in the total number of registers, and thus a reduction in size. Further, the reduction in size of the circuit configuration also enables a reduction in power consumption due to a reduction in the number of elements.

REFERENCE SIGNS LIST 111 key scheduling unit
112 data encryption unit
120 F function
121 XOR operation unit
122 nonlinear transform unit
123 linear transform unit
201 nonlinear transform unit
202 shift low executing unit
203 linear transform unit 204 XOR operation unit
251 key generating unit
252 S-box
253 matrix calculating circuit
254 XOR operation units
271 through 274 logical AND circuit
281 through 284 XOR operation unit
285 through 286 multiplication unit
290 matrix operation circuit
291 through 294 multiplication unit
295 through 298 multiplexer
301 register group
302 XOR operation unit
303 S-box
304 matrix operation circuit
305 XOR operation unit
311 multiplication unit
312 XOR operation unit
313 logical AND circuit
321 XOR operation unit
322 non-linear transform unit [S]
323 linear transform unit [M]
501 register group
502 XOR operation unit
503 S-box
504 matrix operation circuit
511 multiplication unit
512 XOR operation unit
513 multiplexor
603 S-box
604 matrix operation circuit
611 multiplication unit
613 multiplexer
700 IC module
701 CPU (Central Processing Unit)
702 memory
703 encryption processing unit
704 random number generating unit
705 transmission/reception unit

The invention claimed is:

1. An encryption processing device, comprising:
an encryption processing circuitry configured to divide and input data to be processed in data blocks of a configured bit size into a plurality of lines, and repeatedly execute data transformation processing applying a round function on the data transferred to each line, wherein the encryption processing circuitry includes:
operation circuitry configured to generate transformed data regarding the data for a first line from the plurality of lines, perform an operation on the data from the first line and a different, second line regarding the generated transformed data, and repeatedly execute an operation to use the data obtained as a result as input data for a next round, and
a register configured to store the operation results from the operation circuitry,
wherein the operation circuitry is configured to sequentially obtain the data from the register, perform an operation in the sequence the data was obtained, and store the results of which into the register, and
wherein the operation circuitry includes matrix operation executing circuitry configured to execute linear transformations applying a matrix to the data in the first line, the matrix operation executing circuitry being further configured to execute, prior to completion of the execution of a matrix operation on the data in the first line, at least one operation on the data in the second line to combine the data in the second line with at least some of the data in the first line.

2. The encryption processing device according to claim 1, wherein the matrix operation executing circuitry is configured to execute the matrix operation over a plurality of cycles on a plurality of data units sequentially output from upstream non-linear transformation circuitry, and to perform an operation on the data in the second line in conjunction with the matrix operation on the data unit input from the non-linear transformation circuitry during an initial cycle of the plurality of cycles.

3. The encryption processing device according to claim 1, wherein the encryption processing circuitry is configured without an independent register for storing the data from the second line to be used in executing an operation on the data in the second line after an operation cycle of the matrix operation on the data in the first line finishes, and to use a register for storing the results of the matrix operation in progress on the data in the first line as a register for storing the data from the second line.

4. The encryption processing device according to claim 1, wherein the matrix operation executing circuitry is configured to perform an XOR operation on the matrix operation process data regarding the first line and the data in the second line during an initial cycle for executing the matrix operation on the data in the first line.

5. The encryption processing device according to claim 1, wherein the matrix operation executing circuitry is configured to execute the matrix operation applying a cyclic matrix or a Hadamard matrix.

6. The encryption processing device according to claim 1, wherein the encryption processing circuitry includes, as an executing unit of the round function, non-linear transform circuitry configured to execute non-linear transformations, and the matrix operation executing circuitry functioning as a linear transformation unit for executing linear transformations applying a matrix.

7. The encryption processing device according to claim 1, wherein the matrix operation executing device is configured to sequentially input output from an S-box functioning as the non-linear transform circuitry and performs a matrix operation on the input data as one cycle of processing.

8. The encryption processing device according to claim 1, wherein the encryption processing circuitry is configured to execute encryption processing according to a Feistel structure or a generalized Feistel structure.

9. The encryption processing device according to claim 1, wherein the encryption processing circuitry is configured to execute encryption processing according to the CLEFIA encryption algorithm.

10. An encryption processing method executing an encryption processing by an encryption processing device, the encryption processing method comprising:
encryption processing in which an encryption processing unit divides and inputs data to be processed in data blocks of a configured bit size into a plurality of lines, and repeatedly executes data transformation processing applying a round function on the data transferred to each line, wherein the encryption processing comprises:
executing transformation processing on the data for a first line configured from the plurality of lines,
performing an operation on the data from the first line and a different, second line regarding the generated transformed data, and
repeatedly executing an operation to use the data obtained as a result as input data for a next round, wherein, prior to completion of an initial cycle of the execution of a matrix operation for executing the processing to generate transformed data from the data in the first line, at least one operation is performed on the data in the second line to combine the data in the second line with at least some of the data in the first line.

11. At least one computer-readable storage device storing a program for executing an encryption processing in an encryption processing device, the program, when executed, perform a method comprising:

encryption processing in which an encryption processing unit divides and inputs data to be processed in data blocks of a configured bit size into a plurality of lines, and repeatedly executes data transformation processing applying a round function on the data transferred to each line, wherein the encryption processing comprises:

executing transformation processing on the data for a first line configured from the plurality of lines, performing an operation on the data from the first line and a different, second line regarding the generated transformed data, and repeatedly executing an operation to use the data obtained as a result as input data for a next round, wherein prior to completion of an initial cycle of the execution of a matrix operation for executing the processing to generate transformed data from the data in the first line, at least one operation is performed on the data in the second line to combine the data in the second line with at least some of the data in the first line.

* * * * *